US008915243B2

(12) United States Patent
Martínez-Val Peñalosa

(10) Patent No.: US 8,915,243 B2
(45) Date of Patent: Dec. 23, 2014

(54) THERMAL SOLAR ENERGY COLLECTOR

(75) Inventor: José María Martínez-Val Peñalosa, Vicerectorado de Investigacion (ES)

(73) Assignee: Universidad Politecnica de Madrid, Madrid (ES)

( * ) Notice: Subject to any disclaimer, the term of this patent is extended or adjusted under 35 U.S.C. 154(b) by 694 days.

(21) Appl. No.: 13/140,380

(22) PCT Filed: Dec. 3, 2009

(86) PCT No.: PCT/ES2009/000557
§ 371 (c)(1),
(2), (4) Date: Sep. 8, 2011

(87) PCT Pub. No.: WO2010/076350
PCT Pub. Date: Jul. 8, 2010

(65) Prior Publication Data
US 2011/0308513 A1      Dec. 22, 2011

(30) Foreign Application Priority Data
Dec. 31, 2008   (ES) .................................. 200803767

(51) Int. Cl.
*F24J 2/24*      (2006.01)
*F24J 2/26*      (2006.01)
*F24J 2/46*      (2006.01)
F24J 2/50       (2006.01)

(52) U.S. Cl.
CPC ................ *F24J 2/265* (2013.01); *F24J 2/4636* (2013.01); *F24J 2/465* (2013.01); *F24J 2002/502* (2013.01); *Y02E 10/44* (2013.01)
USPC ............ 126/651; 126/654; 126/666; 126/704

(58) Field of Classification Search
USPC .................................................. 126/651–677
See application file for complete search history.

(56) References Cited

U.S. PATENT DOCUMENTS 3,965,887 A * 6/1976 Gramer et al. ................ 126/666
3,980,071 A   9/1976 Barber, Jr.
(Continued)

FOREIGN PATENT DOCUMENTS

| CH | 617 766 | 6/1980 |
|----|---------|--------|
| DE | 26 50 242 | 5/1978 |

(Continued)

OTHER PUBLICATIONS

International Search Report for International Application No. PCT/ES2009/000557 mailed Apr. 7, 2010 (Form PCT/ISA/210).

*Primary Examiner* — Jorge Pereiro
(74) *Attorney, Agent, or Firm* — Merchant & Gould P.C.

(57) ABSTRACT

Thermal solar energy collector, in which a solar radiation absorption panel, inside which the heat-conducting fluid flows, is situated inside a parallelepipedal box, with an opening having a transparent cover at the front, which may be doubled so as to leave an atmospheric space in the middle. The rear wall of the box has a system of seals and reservoirs which are inset in the wall so that they accommodate the expansion and contraction of vertical tubes of the panel and horizontal connections by means of gentle changes in curvature of the tube bends and slight rotations of the reservoirs, with the addition of a system for filling the box with an inert gas, the pressure of which may be chosen from a range of between a thousandth of an atmosphere and one atmosphere, there being provided for this purpose an external gas circuit, with low- and high-pressure tanks, an intermediate compressor.

20 Claims, 25 Drawing Sheets

(56) References Cited

U.S. PATENT DOCUMENTS

| | | | |
|---|---|---|---|
| 4,003,363 A * | 1/1977 | Grossman | 126/661 |
| 4,082,082 A | 4/1978 | Harvey | |
| 4,117,682 A | 10/1978 | Smith | |
| 4,117,831 A * | 10/1978 | Bansal et al. | 126/664 |
| 4,136,674 A | 1/1979 | Korr | |
| 4,178,910 A * | 12/1979 | Gramer et al. | 126/677 |
| 4,261,330 A * | 4/1981 | Reinisch | 126/705 |
| 4,273,105 A * | 6/1981 | Uroshevich | 126/656 |
| 4,480,634 A * | 11/1984 | Kellner | 126/656 |
| 4,569,330 A | 2/1986 | Pettersson | |
| 2007/0084460 A1* | 4/2007 | Beckman | 126/625 |

FOREIGN PATENT DOCUMENTS

| | | | |
|---|---|---|---|
| DE | 27 21 964 | 11/1978 | |
| DE | 102 48 064 | 4/2004 | |
| EP | 0 106 688 | 4/1984 | |
| EP | 0 542 101 | 5/1993 | |
| GB | 2 095 393 | 9/1982 | |
| JP | 57-202453 | 12/1982 | |
| WO | WO 2005059421 A1 * | 6/2005 | F16L 5/02 |
| WO | WO 2006/136341 | 12/2006 | |
| WO | WO 2008/000281 | 1/2008 | |

* cited by examiner

THERMAL SOLAR ENERGY COLLECTOR

This application is a National Stage Application of PCT/ES2009/000557, filed 3 Dec. 2009, which claims benefit of Ser. No. P200803767, filed 31 Dec. 2008 in Spain and which applications are incorporated herein by reference. To the extent appropriate, a claim of priority is made to each of the above disclosed applications.

TECHNICAL FIELD OF THE INVENTION

The invention refers to the field of thermal solar energy, particularly to the one that uses the concentration of source radiation, reflected by some steerable mirrors, and striking on some collectors that absorb part of said radiation to reach high temperature in the beneficial good, which generally materializes in a heat-conducting fluid that carries the solar heat absorbed to a thermodynamic cycle. Within this field the invention refers to collectors themselves, where there is a flat or curve surface which absorbs radiation, and which constitutes the external surface of a body inside which the aforementioned heat-conducting fluid flows. The invention refers to the configuration and constitution of these collectors, to maximize the solar energy collection performance, while they are provided with an intrinsic robustness, which allows them to withstand the thermomechanical effects produced by great variations in temperature and other thermodynamic parameters, when they go from room temperature to being irradiated by concentrated solar energy, and vice versa.

BACKGROUND OF THE INVENTION

Nowadays, it is known the use of a field of steerable mirrors, or heliostats, that concentrate the solar radiation in a receptacle which occupies the upper part of a tower, erected to the south of said field. There exist precedents for this type of configuration, both at the experimental constructive level and at the patent level, among which we can mention, due to its antiquity, the U.S. Pat. No. 4,117,682, which presents a sector-divided field of heliostats, having a tower with a central receptor in each sector of the field.

Alternatively, there may be tower arrangements, but using the whole building facade, not only an upper receptacle, as it can be seen in DE 10248064 A1. Prior to this patent, we can mention U.S. Pat. No. 4,136,674 in which the external surface of the central tower where the radiation reflected by the mirrors is received, is constituted by a bundle of tubes covering it completely. Similarly, we can mention the European Patent Application EP 0106688 A2, intended to improve the performance of tube collectors when they are designed to produce steam, so that it is sought an appropriate distribution of the thermal load between the tubes designed for the boiler, where a phase change is produced, and for the superheater, where there is a temperature increase of the dry steam already separated from the liquid phase, which is recirculated.

In these two patents, two especially serious problems of this panel or collector arrangement or configuration are evident: as these tubes are bare, the natural convection of the circulating air extracts a lot of heat from the irradiated surface, thus decreasing the effectively collected heat, that is, transferred to the heat-conducting fluid, with which the performance of the collector is low or very low; and besides, the oxygen of the air may quickly oxidize the external surface of the hot tube, which will have to be painted with a substance having a high solar absorptivity and a low emissivity, properties which are degraded when the oxygen chemically reacts with said especial paint layer.

The standard answer to these problems is enclosing the radiation collecting surface in a receptacle or a box where a considerable vacuum has been made, and its closing, at the part where the radiation strikes, will be a transparent cover, generally made of glass, in order to let the radiation go through to the interior of the box. This arrangement is even followed in low- and medium-temperature collectors, functioning with direct radiation (not reflected with concentration), though in this case the temperatures reached are much lower. In any case, this arrangement enables to minimize the level of convective heat losses, since there are no convection currents inside the vacuum collector receptacle, and the chemical aggression of oxygen against the external layer of the radiation absorbent surface is also avoided.

This solution, however, has a problem, namely, that the glass of the transparent cover has to work with pressure differences between its walls of approximately one atmosphere, that is, about 100,000 pascals. This pressure difference is very high for a material having a very low elastic limit, such as glass (and it would be even worse for some transparent plastics, because they would also have to withstand temperatures much higher than room temperature, though not as high as the ones of the radiation absorbent surface). This means that the dimensions of the glass cover (or the cover in general), will be very limited by the internal mechanical stresses induced by the aforementioned pressure difference. As in the case of a uniformly loaded beam (that in our case corresponds to a uniform pressure difference) the maximum bending moment depends on the square of the length of the beam, this length will be considerably limited by the effect of the difference between the external pressure (the local atmospheric pressure) and the internal, practically non-existent, one, though in the constructive reality a vacuum of one thousandth of an atmosphere is considered to be sufficient. The glass cover could be very thick, to increase the transverse moment of inertia, thus decreasing the internal stress needed for balancing the induced bending moment, but this possibility presents, in turn, another inconvenience, since there is not any absolutely transparent glass, and the thicker the glass is, the greater the amount of absorbed radiation within itself there would be, which generates higher internal temperatures, and a greater gradient for it, because it is only refrigerated through the external wall, which generates the appearance of mechanical stress induced by thermal differences, that may also be larger than the ones produced by the external and internal pressure difference.

Along with the problems highlighted, another equally important problem should be noted, namely, that the expansions produced when the collector elements go from room temperature to the operation one, which may imply an increase of 500° C. or equal Kelvin in the SI system. In view of the fact that the coefficient of linear expansion of conventional steel is of about 10 millionths per ° C. the increases in length are of about 0.5%, which is quite considerable and has to be taken into account in the design of the radiation absorbent surface, and in the matrix or body on which it is supported, inside which the heat-conducting fluid will flow, to extract the heat and carry it to the main thermodynamic focus. When discussing expansions, it should also be noted that these are smaller on the glass cover than on the absorbent surface and its supporting body. In fact, even the other walls of the collector receptacle, different from the transparent cover, will also be at temperatures much lower than the radiation absorbent parts, otherwise a large part of the energy would escape through these walls, by conduction and convection.

The case described above forms the entire group of problems to be solved by an invention using the natural physical mechanisms, along with the artificial ones that are required, in order to be able to absorb an important fraction of the solar radiation thermal energy, when it is concentrated by means of convergence, on a collector, of the radiation reflected by an array of mirrors whose total reflection surface is much higher than the radiation absorbent surface, contained inside the collector receptacle. A system that could achieve the absorption of thermal solar energy by a heat-conducting fluid avoiding the existing inconveniences of prior art systems was therefore desirable.

SUMMARY OF THE INVENTION

The invention consists in placing the radiation absorbent surface, and its matrix or supporting body, inside of which the heat-conducting fluid flows, in the interior of a big airtight box or receptacle that has a wall constituted by a transparent cover which is penetrated by the radiation to be absorbed; and the rest of the walls will be made of materials which will include mechanically strong structures, as well as thermal insulation; proposing an arrangement of the essential thermal component in such a way that it easily allows the assimilation of its expansions without altering the airtightness of the receptacle or box, which will be, in a first option of the invention, in vacuum conditions.

The component arrangement helps to minimize heat losses by conduction and convection towards the exterior; and the chemical aggression to the external layer of the radiation absorbent surface is minimized as well, thanks to the internal vacuum and the absence of oxygen. As an alternative to vacuum, the invention provides for the injection of an inert gas, such as nitrogen, in the interior of the receptacle, with an active system for maintaining the pressure vis-à-vis any change of temperature in the filling gas; being it also possible to place a double thin transparent cover, but with very low mechanical stress and low heat losses by convection. In any case, the expansions of the essential thermal component elements will be completely compensated, without creating stresses which may rapidly damage any element. Additionally, in the case of the more elaborate option of the invention, the external (local atmospheric pressure) and the internal pressure of the box or receptacle, will be equaled, so that the glass cover will be subjected to equal pressures on both faces, thus without suffering any mechanical stress difficult or impossible to withstand by glass or any other similar transparent material, in which it would be difficult to guarantee the resistance with a pressure difference of one atmosphere (1 bar, or 100,000 Pa) if the surface dimensions of the cover are large.

The present invention solves the problems in the prior art by a thermal solar energy collector formed by a plurality of collecting conduits, which absorb the solar energy striking them, inside which the heat-conducting fluid that collects the solar energy absorbed by the collecting conduits flows. The collecting conduits are vertical and have an inlet end and an outlet end.

The collector has also means for delivering the heat-conducting fluid to the collecting conduits, which are connected to the inlet ends of said collecting conduits, and means for collecting heat-conducting fluid from the collecting conduits, which are connected to the outlet ends of the collecting conduits.

In the collector, the collecting conduits, as well as at least part of the means for delivering heat-conducting fluid to the collecting conduits, and at least part of the means for collecting heat-conducting fluid from the collecting conduits, are arranged inside an airtight box 100, whose structure is formed by a resistant internal metal plate and a resistant external metal plate, and between the internal and external plates, an intermediate space filled with a thermal insulation material.

The box is formed by an upper wall, a lower wall, side walls, and a rear wall in which at least part of the means for delivering heat-conducting fluid and at least part of the means for collecting heat-conducting fluid are inset in airtight housings covered by seals made of elastic and thermal insulation materials which absorb the deformations of the means for delivering and the means for collecting heat-conducting fluid of substantially 0.1%. Also, there exists a front wall that has a surface opening for the passage of solar radiation to the collecting conduits. The opening is closed by a transparent cover inset on the front wall by means of a pressure seal.

The collecting conduits may be either a plurality of straight rectangular section channels that form a continuous panel having a front flat surface, or a plurality of collecting tubes that form a vertical bundle, or with an inclination of substantially 10 sexagesimal degrees forward.

According to a particular embodiment of the invention, the means for delivering heat-conducting fluid to the collecting conduits are formed by first connection tubes that have a 90° bend, and that are connected by one of their ends to the inlet ends of the collecting conduits, and by their other end to at least one horizontal cylindrical inlet tank inset on the rear wall of an airtight housing. The housing is covered by a first thermal and elastic insulation seal that covers its entire volume, and that absorbs deformations of the inlet tank of substantially 0.1%, and the inlet tank is connected in a diametrically opposite zone to that of the first connection tubes to a plurality of heat-conducting fluid inlet tubes to the collector. According to this embodiment, the means for collecting heat-conducting fluid from the collecting conduits have second connection tubes which have a 90° bend, and which are connected by one of their ends to the outlet ends of the collecting conduits, and by their other end to at least one horizontal cylindrical outlet tank inset on the rear wall in an airtight housing. The housing is covered by a second thermal and elastic insulation seal that covers its entire volume, and that absorbs deformations of the outlet tank of substantially 0.1%, and the outlet tank is connected in a diametrically opposite zone to that of the second connection tubes to some of heat-conducting fluid outlet tubes of the collector.

In order to avoid having fluid coming from different tubes at different temperature, preferably, the collector has a temperature homogenization tank arranged between the collecting conduits, at half the height thereof, dividing the collecting conduits into two sections.

The collector may have a metallic screen for radiation absorption, highly conductive, which is fixed to the front part of the collecting tube bundle. This metallic screen for radiation absorption is covered by a layer having high absorptivity and low emissivity to radiation, which may be painted or adhered.

Besides, the external surface of the box walls is covered by a coating having high reflectivity to radiation, which may also be painted or adhered, and the internal surface of the box walls is covered with a coating having high reflectivity to radiation, which may also be paint or an adhesive.

According to a particular embodiment of the invention, the collecting tube bundle is divided into several sub-bundles, and there is a supporting piece between every two consecutive sub-bundles, parallel to said sub-bundles. These supporting pieces rest by their rear edge on the rear wall of the airtight box, and the transparent cover rest on the front edge of the supporting pieces. According to this configuration, the means for delivering heat-conducting fluid to the collecting tubes have an inlet tank for each sub-bundle, and the means for collecting heat-conducting fluid from the collecting tubes have an outlet tank for each sub-bundle. These supporting pieces are transparent and are made of the same material as the transparent cover, or alternatively, they are made of the same material as the internal plate of the airtight box structure and have the same high reflectivity index coating.

According to a particular embodiment of the invention, the outlet tubes of the collector, beyond the rear wall, have a 90° bend to vertically direct the outlet tubes, and the means for collecting heat-conducting fluid from the collecting conduits also have a mixing and temperature and pressure homogenization tank which is connected to the final end of the outlet tubes.

According to another particular embodiment, the means for delivering heat-conducting fluid to the collecting tube bundle have a distributor head to which the heat-conducting fluid arrives through an inflow conduit that goes through the rear wall of the airtight box through a hole in the rear wall, in which there is a fourth spherical seal. Besides, the means for collecting heat-conducting fluid from the bundle have a collecting funnel connected by its larger end to the outlet end of the collecting tubes and by its smaller end to an outlet conduit that goes through the rear wall of the box through a hole in the rear wall, in which a third spherical seal is provided. Additionally, this embodiment may present a high conductivity metallic screen which is fixed to the front part of the tube bundle, which is covered with a layer having high absorptivity and low emissivity to radiation, also painted or adhered.

The collector tubes may have an approximately 10° inclination angle relative to the vertical, and there may also be a temperature homogenization tank which is interposed in the collecting tubes, at half the height thereof, and divides them into two sections longitudinal in height.

Particularly, the collecting tube division into sub-bundles may be applied to the configuration of both the distributor head and the collecting funnel, and therefore there will be a distributor head and a collecting funnel for each one of the existing sub-bundles.

According to an alternative embodiment for the configuration of sub-bundles, the transparent cover that closes the surface opening of the front wall is divided into a plurality of transparent vaults each one of which is arranged to cover each one of the collecting tube sub-bundles.

Besides, the airtight box may have on its lower wall a channel for suctioning gas from the inside of the box, said channel being connected to a suction compressor to produce the vacuum in the interior of said airtight box, the channel being provided with a shut-off valve.

According to an alternative embodiment of the invention, the interior of the airtight box may be filled with an inert gas, such as nitrogen or carbon dioxide. Thus, the internal pressure of the airtight box is maintained substantially equal to the atmospheric pressure by a pressure control circuit formed by a gas extraction tube having a first shut-off valve and a first gas flow control valve which is mechanically or electromechanically activated by the pressure difference existing between the airtight box interior and the atmospheric pressure. The circuit also has a first gas reservoir which stores the inert gas extracted from the airtight box when it is necessary for pressure control, and that is at a pressure lower than the atmospheric pressure. This first gas reservoir is connected to a compressor that takes gas from the first gas reservoir and injects it into a second gas reservoir, which is at a pressure higher than the atmospheric pressure, and injects inert gas into the airtight box when it is necessary for pressure control. Both the first and second gas reservoirs are reinforced to withstand any pressure that is lower or higher than the atmospheric pressure.

Preferably, the collector object of the present invention has an additional transparent cover which is fixed parallel to the original transparent cover, inset on the front wall of the airtight box by means of an additional pressure seal. Between both covers there exists an intermediate space which is thinner than the transparent covers and which is connected to the exterior by means of holes in the lower part of the front wall of the box, having said holes some filters with a sieve having holes smaller than one millimeter.

Besides, the collector may present some first fins obliquely welded in the interior of the front wall of the airtight box, arranged above the transparent cover, which form an acute angle with the front wall and which are oriented towards the lower wall of the box. Besides, it may present some second fins obliquely welded in the interior of the front wall of the box, and which are below the transparent cover, forming an acute angle with the front wall and oriented towards the lower wall of said box. Finally, it may have third fins, which are obliquely welded along the interior of the rear wall of the box, and which form an acute angle with the rear wall, being oriented towards the upper wall of the box, and said third fins having such a length that in their expansion at the collector nominal operation temperature, their free end remains separated from the rear surface of the collecting conduits by a distance that is between half a millimeter and one millimeter. The gas convective movement in the interior of the box is hindered by all these fins, which are made of an insulation material and covered with a coating having high reflectivity to radiation, selected between paint and adhesive.

BRIEF DESCRIPTION OF THE DRAWINGS

There follows a description of an embodiment of the invention relating to a series of drawings which will help understand the invention better presented as an illustrative and non-limiting example thereof.

Figure 1:
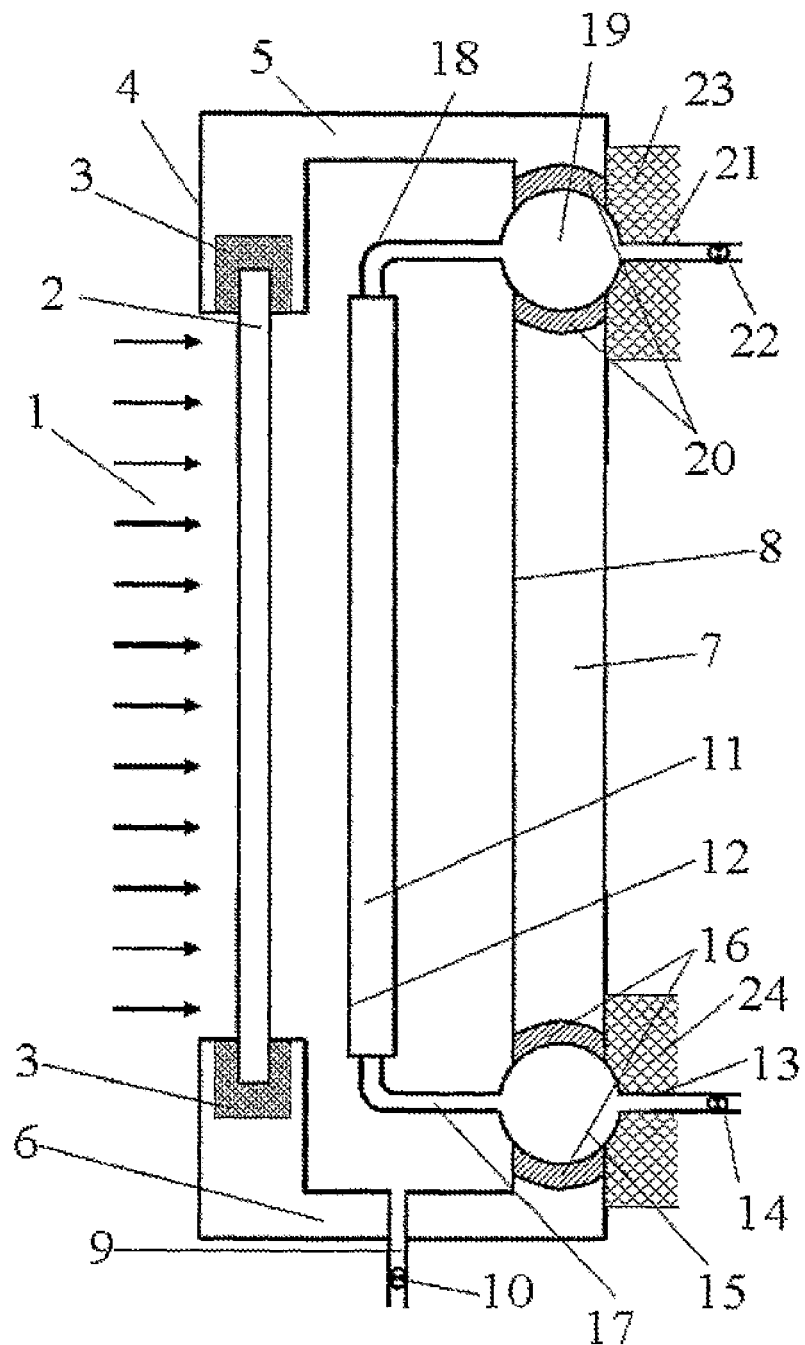
FIG. 1 represents a vertical cross-sectional view of a particular embodiment of the collector object of the present invention in which the collecting conduits are collecting tubes.

Reference is made to the following set of elements in the figures:
1. Solar radiation striking on the collector
2. Transparent cover of the airtight box
3. Pressure seal of the transparent cover of the front wall of the airtight box
4. Front wall of the airtight box
5. Upper wall of the airtight box
6. Lower wall of the airtight box
7. Rear wall of the airtight box
8. Coating of the internal and external surfaces of the walls of the airtight box
9. Suction channel of the airtight box
10. Suction channel shut-off valve of the airtight box
11. Collecting tubes
12. External surface of the collecting tubes
13. Heat-conducting fluid inlet tubes to the collector
14. Shut-off valve of the heat-conducting fluid inlet tubes to the collector
15. Inlet tank of the means for delivering heat-conducting fluid
16. First seal that covers the inlet tank
17. First connection tubes of the means for delivering heat-conducting fluid
18. Second connection tubes of the outlet means for the heat-conducting fluid
19. Outlet tank of the outlet means for the heat-conducting fluid
20. Second seal that covers the outlet tank
21. Heat-conducting fluid outlet tubes from the collector
22. Shut-off valve of the heat-conducting fluid outlet tubes from the collector
23. Thermal insulation of the heat-conducting fluid outlet tubes from the collector
24. Thermal insulation of the heat-conducting fluid inlet tubes to the collector
25. Collecting tube bundle
25'. Sub-bundle into which the collecting tube bundle is divided
26. Temperature homogenization tank
27. Metallic screen for radiation absorption
28. Continuous panel of channels with flat front surface
29. Straight section channels
30. Supporting pieces of the transparent cover
31. Outlet bend
32. Mixing and temperature and pressure homogenization tank
33. Collecting funnel
34. Heat-conducting fluid outlet conduit
35. Third seal that embeds the outlet conduit in the rear wall
36. Thermal insulation of the heat-conducting fluid outlet conduit
37. Shut-off valve of the heat-conducting fluid outlet conduit
38. Oblique collecting conduit to the collecting funnel, to the intermediate redistribution tank and to the distributor head
39. Intermediate fluid flow redistribution tank
40. Lower section of the oblique collecting conduit to the collecting funnel, to the intermediate tank and to the distributor head
41. Heat-conducting fluid distribution head
42. Heat-conducting fluid inflow conduit
43. Fourth seal that embeds the outlet conduit in the rear wall
44. Shut-off valve of the heat-conducting fluid inflow conduit
45. Thermal insulation of the heat-conducting fluid inflow conduit
46. Vaults of the transparent cover
47. First semispherical part of the spherical seals
48. Second semispherical part of the spherical seals
49. Gas extraction tube of the pressure control circuit
50. First shut-off valve of the pressure control circuit
51. First gas flow control valve of the pressure control circuit
52. First gas reservoir of the pressure control circuit
53. Compressor of the pressure control circuit
54. Second gas reservoir of the pressure control circuit
55. Tube for discharging gas into the pressure control circuit
56. Second gas flow control valve of the pressure control circuit
57. Second shut-off valve of the pressure control circuit
58. First fins on the front wall of the airtight box of the collector
59. Third fins on the rear wall of the airtight box of the collector
60. Second fins on the front wall of the airtight box of the collector
61. Internal plate of the airtight box
62. Intermediate space of the airtight box 63. External plate of the airtight box
64. Intermediate space between the transparent covers
65. Additional transparent cover
66. Additional pressure seal of the transparent cover of the front wall of the airtight box
67. Holes in the lower part of the front wall of the airtight box
68. First filter of the holes
69. Second filter of the holes
70. Heliostats for reflecting the direct source solar light
71. Direct solar light
72. Collecting assembly
73. Structural beams from which collectors hang
74. Constructive structure which the structural beams are a part of and which forms the array of collectors
75. System for compensating the internal pressure of the filling gas of the boxes
76. Heat-conducting fluid inflow tubing from the beneficial good
77. Heat-conducting fluid impulse pump
78. Heat-conducting fluid outlet tubing towards the beneficial good
79. Tanks of heat-conducting fluid temperature standardization and transient damping
80. Pieces integral to the structural beams, from which the collectors hang
81. Lugs of the collector for securing it
82. Holes in the lugs for through screws
83. Upper quarter of the box wall
84. Medium upper quarter of the box wall
85. Medium lower quarter of the box wall
86. Lower quarter of the box wall
87. Assembling wedge of the box
88. Weld beads of the assembling wedge of the box
89. Side wall of the assembling wedge
90. Edges of the wedge for its welding to the side walls of the box
91. Upper surface of the airtight box
92. Rear surface of the airtight box
93. Side surface of the airtight box
94. Angle joint bar of the upper-side union of the airtight box
95. Angle joint bar of the upper-rear union of the airtight box
96. Angle joint bar of the rear-side union of the airtight box
97. Dihedral angle joint bar
98. Right angle of the dihedral angle
99. Beveling at the ends of the joint bar
100. Airtight box

DETAILED DESCRIPTION OF PREFERRED EMBODIMENTS OF THE INVENTION

FIG. 1 represents a cross-sectional view of the general configuration of the proposed invention, showing the radiation striking the collector, 1, which may be direct from the sun, though in general it will come from several mirrors which concentrate it on the collector, to achieve higher temperatures, as the received intensity is larger, in power per surface unit, that is, watts per square meter. The radiation will mainly cross the transparent cover 2, which is embedded, through a seal 3 in the front wall 4 of the box 100 of the collector. This box 100 is airtight, as it is closed by the aforementioned front part, comprising that said wall plus the cover 2, as well as the upper walls, 5, and lower walls, 6, plus the side walls, without any especial function to mention, plus the rear wall, 7, which is not continuous rather it has bores where the heat-conducting fluid inlet tanks, 15, and outlet tanks, 19 rest; though the assembly is airtight due to the seals of the inlet tank, 16, and the outlet tank, 20. In this way the vacuum can be maintained in the interior of the box 100, which is produced through the connection tube 9 with the compressor or vacuum pump which will extract the interior gas, and there also existing a shut-off valve, 10, of the tube 9, for maintaining the vacuum produced, that in an first approach may be of about one thousandth of an atmosphere, although this value will be subsequently altered for some, more complex, alternative assemblies of the invention.

The heat-conducting fluid reaches the collector through the tubes 13, whose passage may be closed, for the hydraulic isolation of this circuit, by means of the valves 14, the fluid reaching the tank 15, from which it continues through the tubes 17, which have a bend shape, which allows them to easily accommodate expansions, with a gentle change of their curvature angle. Said tubes 17 carry the fluid to the body or matrix 11, whose external surface 12 is the one that receives most of the solar radiation 1, which is absorbed therein due to its high absorptivity optical properties, its emissivity being very low. This makes a high fraction of the energy of that radiation pass to the heat-conducting fluid, which goes up through the interior of the body or matrix 11, whose internal structure will be described below. After passing through said body, with its consequent heating, the fluid goes out from the collector through the tubes provided with bends 18, connected to the outlet tank 19, which is embedded in the rear wall, 7, having a seal 20, which covers and insets it in said wall 7. In view of the cylindrical shape of the aforementioned tanks 15 and 19, which will be described in greater detail below, the inlet and outlet tubes have certain clearance, so that when the body 11 expands, the bends of the tubes 17 and 18 will have a tendency to go down and up respectively, which will make the tanks 15 and 19 slightly rotate counterclockwise and clockwise, respectively. Inducing similar rotations in their respective external tubing, 13 for the tank 15, and 21 for the tank 19. They are referred to in the plural because there may be several inlet and outlet tubes, in parallel, as it is clear in the drawings below.

In order to hydraulically isolate the heat-conducting fluid circuit section, which corresponds to the collector, the tubes 13 have some valves 14, and the outlet tubes, 21, the valves 22. In this way, in case that the collector needs repair, because it has leaks in its internal elements the collector disassembling may be performed without any problems, following the procedure opposite to the assembling, which will also be described as part of this invention.

In view of the high temperature of the heat-conducting fluid, and the interest in minimizing heat losses, the external tubes, both 13 and 21, are thermally insulated, as signaled with the components 24 and 23, respectively. These insulators are made of a conventional material, such a fiberglass.

It should be noted that the material of the components may also be conventional in the thermal industry, adjusting its selection according to the desired temperatures, the higher the solar light concentration factor, the higher the temperature will be. In general, for the essential thermal component, a high thermal conductivity material will be sought, and in that sense copper and aluminum will be preferred rather than steel, but other factors will also be taken into account, such as chemical compatibility and the absence of corrosion vis-à-vis the heat-conducting fluid.

For the walls of the box 100 a sandwich-type structure is used, which is also common in the thermal industry, with two, normally metallic, rigid surfaces for the internal and external parts, and a thermal insulator between them. The object of the rigid surfaces is to provide the assembly with mechanical resistance. Besides the possible pressure differences between the interior and the exterior of the box 100, this will have to withstand its own weight, since the assembly, including the collector, will remain hung to the upper part of the box 100, as it will be specified in a subsequent figure, to be able to conveniently receive the light reflected by a field of heliostats, which will be the most interesting application. The metallic external surface of the box 100 is especially important, since the mounting welding will be made on it, which will make the interior of the box 100 airtight and also allow the coupling of the inlet and outlet tanks, with their corresponding seals. On the other hand, the entire internal surface of the box 100, as it has been previously explained, will be painted with, or will have an adhesive layer of, a material that mainly reflects the solar radiation. The external surface will be painted in the same way, particularly the front wall 4, since if a radiation focusing error occurs, and it strikes on the surface of the box 100, without any suitable refrigeration, the box 100 could suffer mechanical damage, and even be melted in part, if it does not have high reflectivity.

Figure 2:
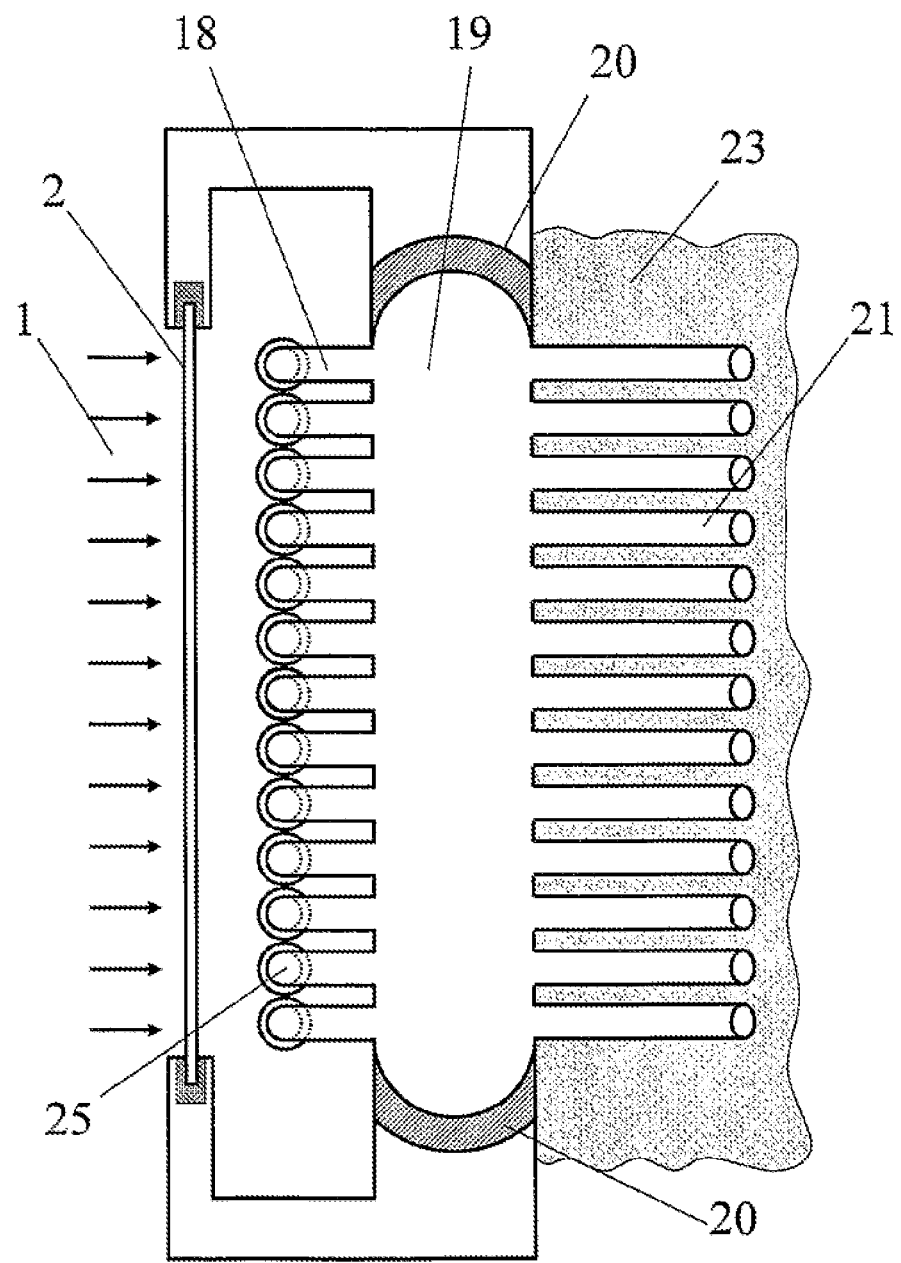
FIG. 2 presents a horizontal cross-sectional view at the height of the heat-conducting fluid outlet tank of the collector of FIG. 1.

FIG. 2 presents a horizontal cross-sectional view of one of the arrangements that the invention may take. The section is performed at the level of one of the penetration tanks of the box 100, which may be both the inlet tank, 15, and the outlet tank, 19. For accuracy reasons, the latter is represented in the figure, along with the seal 20, and the outlet tubes 21, a parallel bundle thereof is represented, like that of the tubes 18, which number can be as high as required by the application.

It is very important to highlight that the matrix or body that supports the passage of the heat-conducting fluid through the collector, indicated with the number 11 in FIG. 1, takes the form in this case of a parallel tube bundle, 25. It is important to highlight that this parallel tube bundle forms the channeling matrix for the flow of the heat-conducting fluid through the collector, in one of the basic alternatives of that matrix, though not the only one, as will be seen in other figures. Finally, it should be added that the exterior of these tubes must be painted with the material having a high solar light absorptivity, which was designated as surface 12 in the previous figure, although it may be an adhesive instead of paint. As it can be seen in the figure, the tubes 25 are practically tangent to each other, at operation temperature, in order to form in a practical manner a screen for the striking radiation, while the tubes 18, which have bends to accommodate longitudinal expansions, are thinner, non-tangent to each other, to allow their better insertion into the tank 19, although a possible alternative would be collecting them in only one conduit, as it will be seen in another figure. In order to measure the radius of the tubes 25, a linear expansion coefficient of the tube material, and the temperature increase that is sought to obtain will be used, according to the thermal balance point of the particular application that is projected. If said coefficient is named "A" and the temperature increase is called "T", the radius of the cold tubes 25, named "F", will be obtained from the hot radius, "L", which will be equal to the width of the transparent cover 2, divided by the number of tubes. This relation is the following:

$$F=L/(1+A*T)$$

Figure 3:
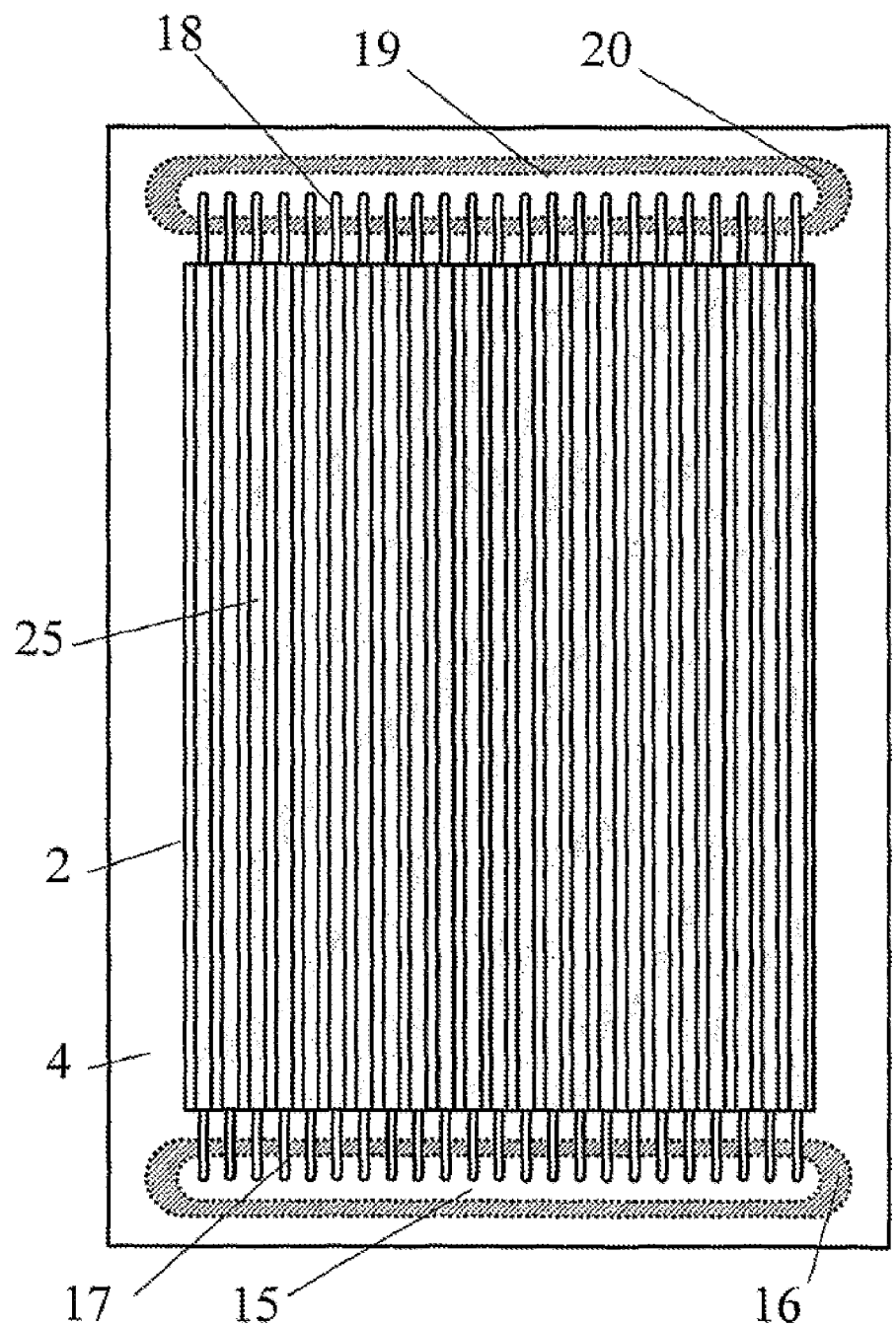
FIG. 3 represents a schematic front view of the collector of FIGS. 1 and 2.

FIG. 3 represents a front view of the collector, in which the front wall 4 can be seen, which frames the opening of the transparent cover, 2, revealing the tube bundle, 25, where the radiation is absorbed. In the lower part there is an inlet tank 15, with its seal 16 and the tubes 17 which connect it to the bundle 25. Similarly on the upper part there are the tubes 18, the outlet tank 19 and the seal 20. It should be noted that, like the internal surface of the box 100, and as it has already been indicated, the external surface of the front wall must also be painted with a material having high reflectivity to radiation, or an adhesive layer having those properties against the wavelength radiation of solar light.

Figure 4:
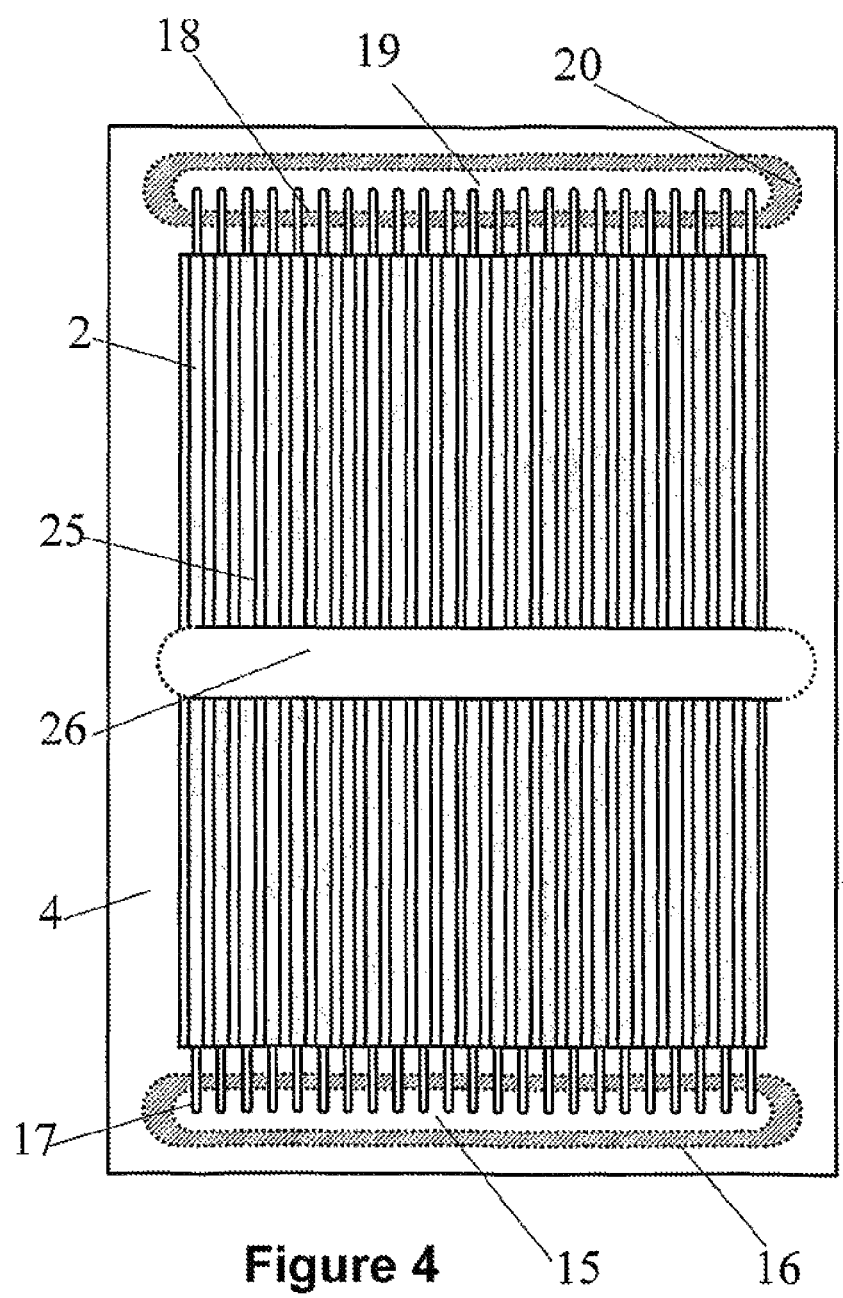
FIG. 4 represents a front view of an alternative embodiment of the invention which includes an intermediate temperature homogenization tank.

FIG. 4 represents an alternative to the arrangement shown in FIG. 3, since in this figure an intermediate tank 26 has been included for mixing the heat-conducting fluid flow, in order to balance temperatures in the different tubes of the bundle 25. This is desirable in view of the fact that it is not easy to ensure the uniformity of the radiation intensity received by the different tubes of the bundle, also depending on the height, since the heliostats will have some uncertainties of collimation when aiming at the collector that will receive the light by reflection. In general, the side tubes will receive less radiation intensity, and its value will even be almost non-existent, since attempts will be made to prevent the radiation from striking on the front wall of the box 100, because it would be lost. By introducing the intermediate tank 26, the fluid flow is redistributed, which balances the temperatures of the tubes, and prevents excessively hot points.

Figure 5:
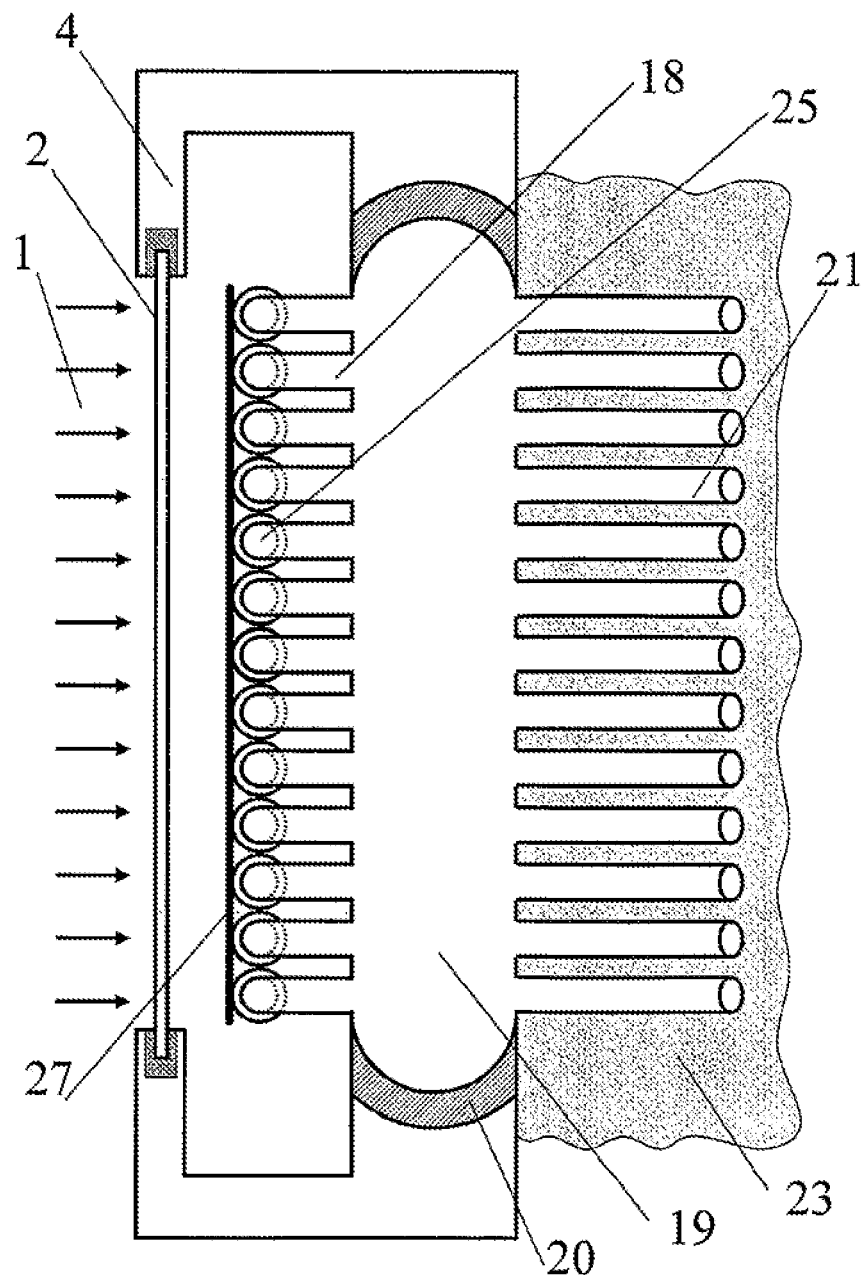
FIG. 5 is a horizontal cross-sectional view at the height of the heat-conducting fluid outlet tank of a particular embodiment of the previous collector which includes a metallic screen for radiation absorption.

FIG. 5 is similar to FIG. 2, but in this figure an optional, but important, constructive element is added, which is the front screen 27, which is the one that will receive the radiation, and on which the tubes of the bundle 25 are welded. Conceptually, the screen 27 has the same function as the surface 12, exposed in FIG. 1, since it will have high absorptivity to solar light, and very low emissivity. Here it is identified with its own numbers because it is achieved in a specific manner, suitable for the configuration of the tube bundle proposed for the matrix for the passage of fluid. The screen 27 has the function of absorbing the radiation and transmitting it to the tubes with certain redistribution of the received heat load, for which it has to have high heat conductivity.

Although it provides an advantage in view of the thermal benefits of the tube bundle, it has the inconvenience that it may generate mechanical stresses caused by expansion differences in the tubes, if they are not equally heated. Hence, using this alternative or not will depend on how both aspects, thermal redistribution and stress, are considered. In general, it will be possible to choose using a screen if it is made of a material having high conductivity, so then heat distribution will be highly balanced throughout it, and the tubes will reach very similar temperatures, which will cause their expansions to be similar too, and the mechanical problems will be negligible.

It should be noted that, for the heat transfer from the screen to the tubes to be good, the welding or joining method must be efficient, in the sense of having no discontinuities, since they would present unacceptable resistance to heat transfer.

Figure 6:
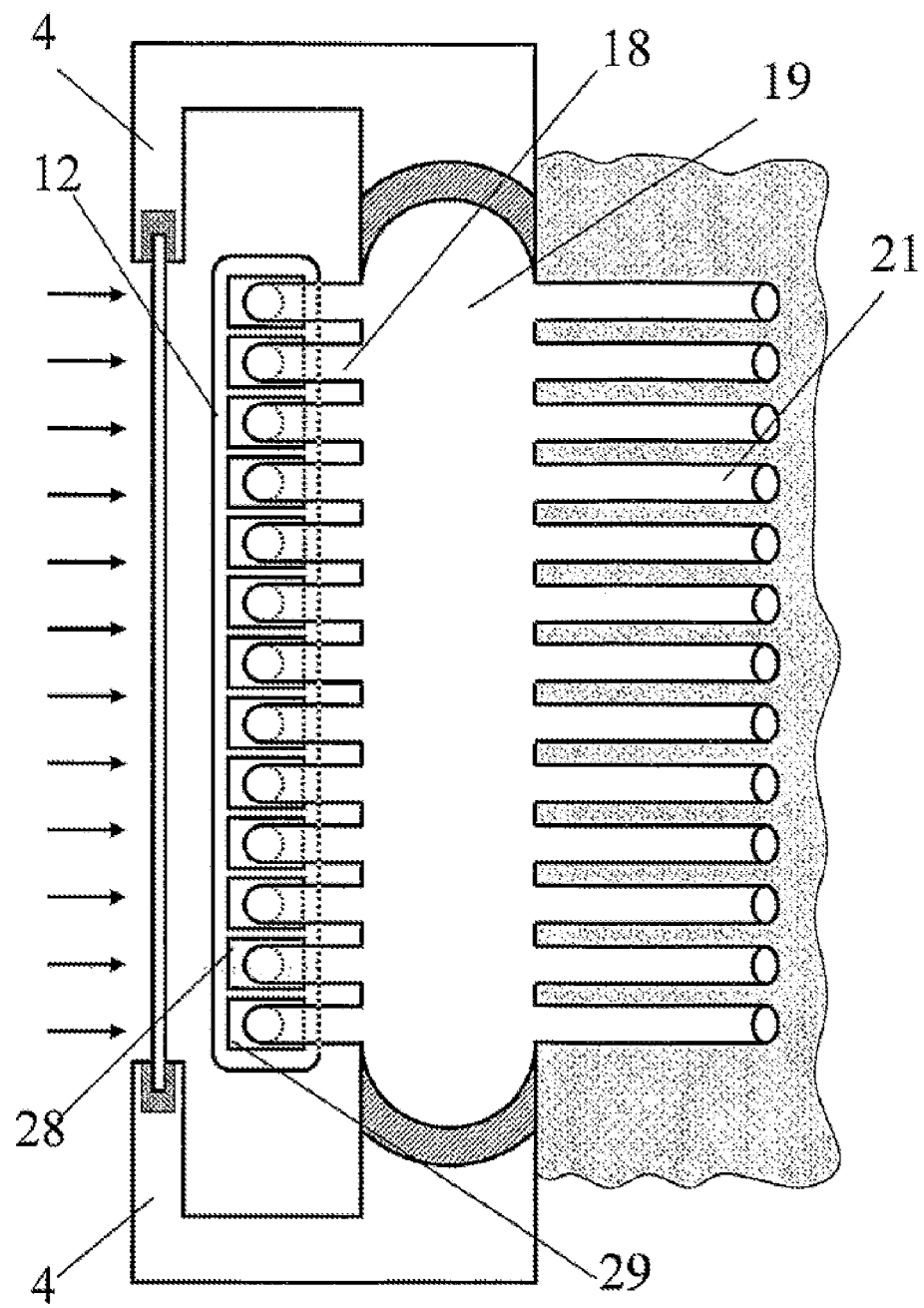
FIG. 6 represents a cross-sectional view of a particular embodiment of the collector object of the present invention in which the collecting conduits are straight section channels which form a panel.

That is why the most suitable alternative is that of FIG. 6, in which the tube bundle 25 has been replaced by a panel 28, formed by a set of adjacent fluid passage channels that are rectangular in their straight sections, which allow a better adhering or painting of a layer on their external surface as indicated with number 12, already presented in FIG. 1. In this way, the heat distribution from the absorption surface 12 to the heat-conducting fluid channels is much more efficient. Each channel 29 of the panel 28 will be joined to an inlet tube 17 from the tank 15, and to an upper outlet tube, 18, which ends, hydraulically, into the tank 19.

Figure 7:
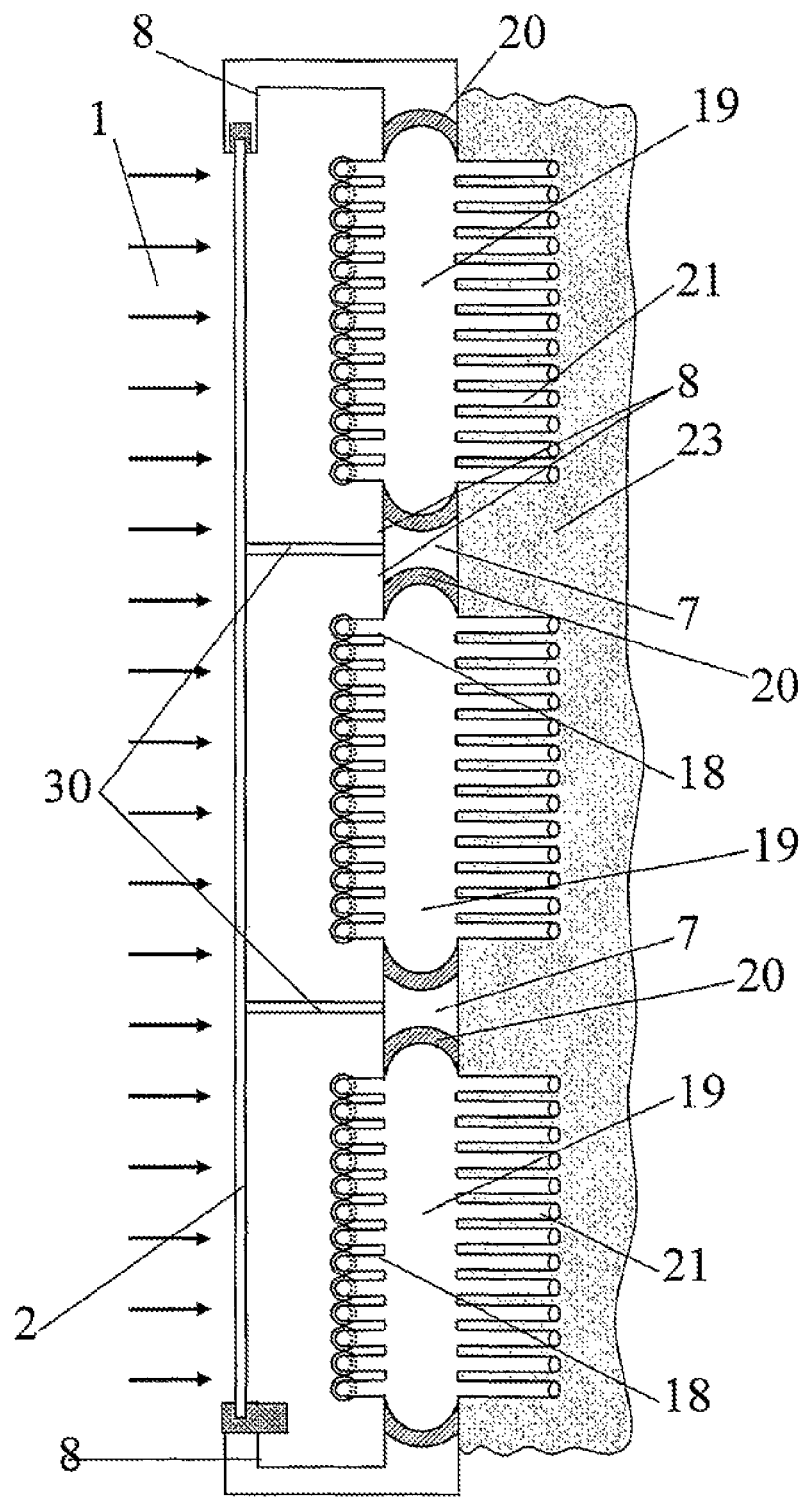
FIG. 7 represents a particular embodiment of the invention in which the collecting tube bundle is divided into several sub-bundles divided by supporting pieces on which the transparent cover is supported.

However, the aforementioned problem still remains, namely that in the interior of the box 100 of the collector there exists a vacuum, and therefore almost null pressure, and in the exterior there will be the environmental atmospheric pressure, in the range of about 100,000 Pa, which will cause the transparent cover to be subjected to some very high mechanical stresses, hardly withstood by a glass panel. That is why FIG. 7 features an alternative for preventing the breaking of the glass panel or the transparent material of the cover caused by an excess of load and deformation. It is known that the maximum bending moment of an evenly loaded beam depends on the square of the beam length, so that the usual way for reducing that moment value, which in turn generates the internal stresses in the beam, is reducing the length thereof by placing intermediate supporting pieces. These are represented in FIG. 7 by means of the elements 30, which in a first option may also be made of transparent glass, so that the radiation can go through them. As the glass has reasonably good compressive strength, these supporting pieces will be effective for transferring the mechanical stresses to the rear wall, 7, of the box 100, which will have a metallic part in its structure, as it has already been said, to provide it with the necessary rigidity. As an alternative to the pieces 30 made of a transparent material, pieces made of a metallic material such as that of the internal wall of the box 100 may be used, covered with paint or with a highly radiation reflective layer adhered thereto, layer 8.

The previous concept of a beam may be applied to both directions of the surface of the transparent cover, but in view of the vertical arrangement of the tubes 25, or the panel 28, they can only be placed in a vertical direction as well, as shown in FIG. 7, which corresponds to a horizontal cross-sectional view. The idea corresponds to dividing the tube bundle 25, or the original panel 28 into separate, parallel sections that are encased in the corresponding part of the box 100, separated from each other by the rectangles 30, made of either glass or a reflective metallic material. Each one of the tube sub-bundles, or pieces of panel, has a connection to the exterior on the rear part of the panel, as shown in FIGS. 1 and 2. In FIG. 7, similar to FIG. 2, it is shown how for each tube sub-bundle there is a tank embedded on the rear wall, to which the tubes are connected, on both the interior and the exterior of the box 100. In FIG. 7, as in FIG. 2, only the outlet upper tanks 19 have been represented, also representing the seals 20, which embed them in an airtight manner, one by one, into the wall, 7.

Figure 8:
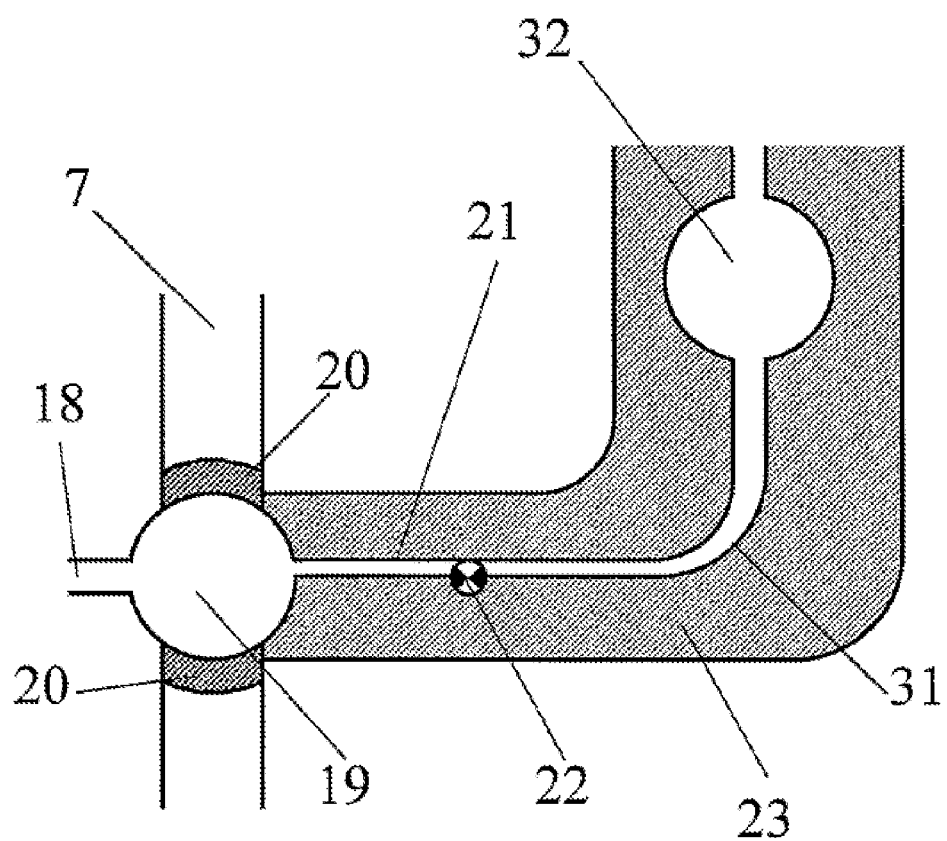
FIG. 8 represents a transverse cross-sectional view of a detail of the housing of the heat-conducting fluid outlet tank on the rear wall of the airtight box.

FIG. 8 precisely represents a transverse cross-sectional view of the housing of tank 19 on the rear wall 7. The tubes 18 arrive to the tank, whose bended part is not represented in this figure, which focuses on the external part of the box 100. It is highlighted, however, that the tank has to be covered by a seal made of materials such as graphite or silicon carbide, which withstand well the heat-conducting fluid temperatures, have structural rigidity and certain elasticity under compression. From the tank 19 the tubes 21 extend to the exterior, which are provided with a shut-off valve, 22, in case the fluid passage needs to be interrupted. In order to accommodate the expansions and contractions of starts and stops, and changes in the fluid temperature, the tubes 21 will also have a part in the form of a bend, 31, which sends the fluid upwards, since in general this outlet will have to be connected to the following collector inlet, which will be at a higher level. In order to balance the temperatures of the heat-conducting fluid that emerges from the box 100 through the tubes 21, it is convenient to have a tank such as the one represented by the component 32. Thus, the fluid entrance into the following collector would be properly prepared.

Figure 9:
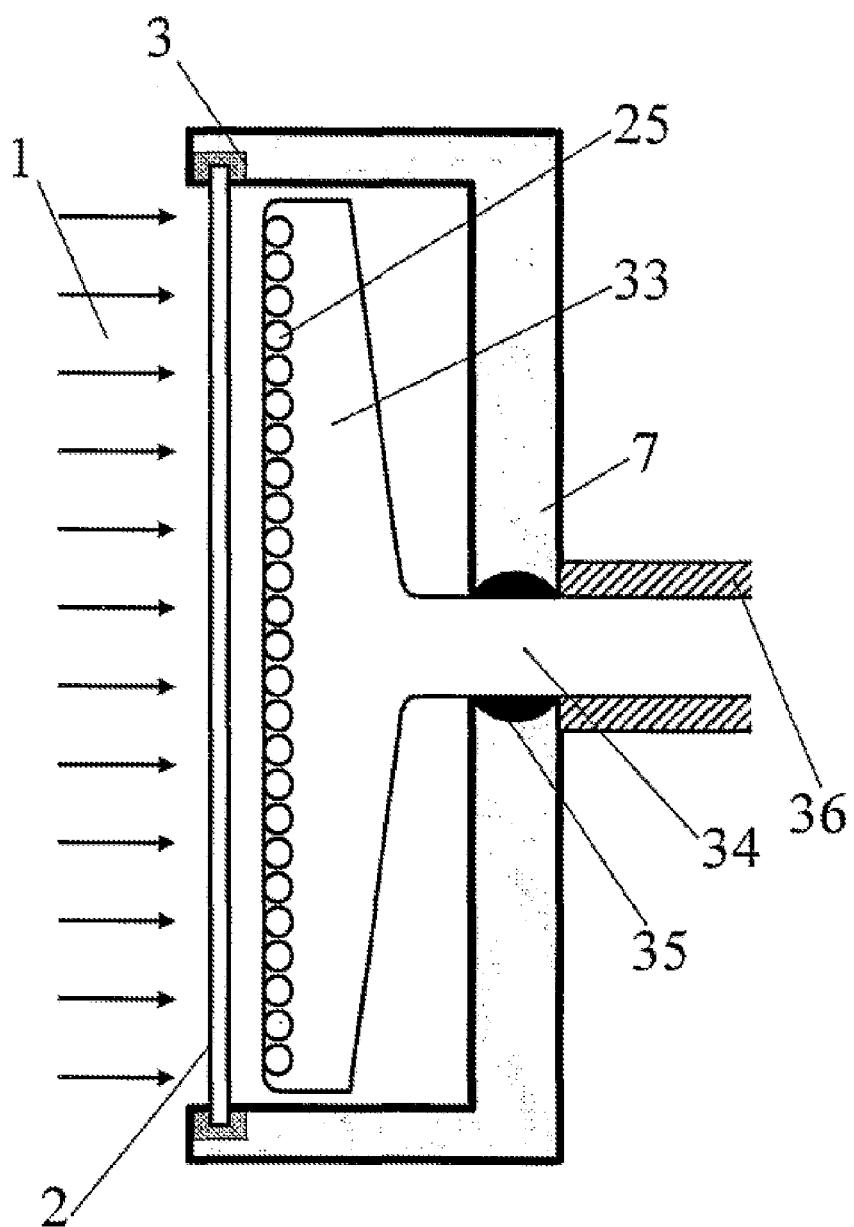
FIG. 9 shows a horizontal cross-sectional view of an alternative arrangement of the collector in which the upper part of the collecting tubes is connected to a collecting funnel.

FIG. 9 shows an alternative arrangement for the channeling, towards the outlet of the box 100, of the heat-conducting fluid that has ascended through the solar radiation absorbent tube. In this case on the upper part of the tubes 25 a bend-having tube 18 is not welded to each one of them, rather the upper part of the tubes is welded to a common collector, horizontally arranged, as it will be shown in the subsequent figure. This collector is shaped like a funnel, and carries the fluid flow towards an outlet conduit, 34, that crosses the wall through a spherical-type seal or bearing, 35, made of a material similar to that of the previously presented seal 20 (though materials which are less expensive than graphite may be used, such as pressed cork, especially for applications at not very high temperatures, though its deterioration will be very fast, and there may even be a risk of fire, which is very unlikely in the case of pressed graphite or silicon carbide). The conduit 34 is thermally insulated on its exterior, by means of the component 36, which may be glass-wool or another high temperature insulator.

Figure 10:
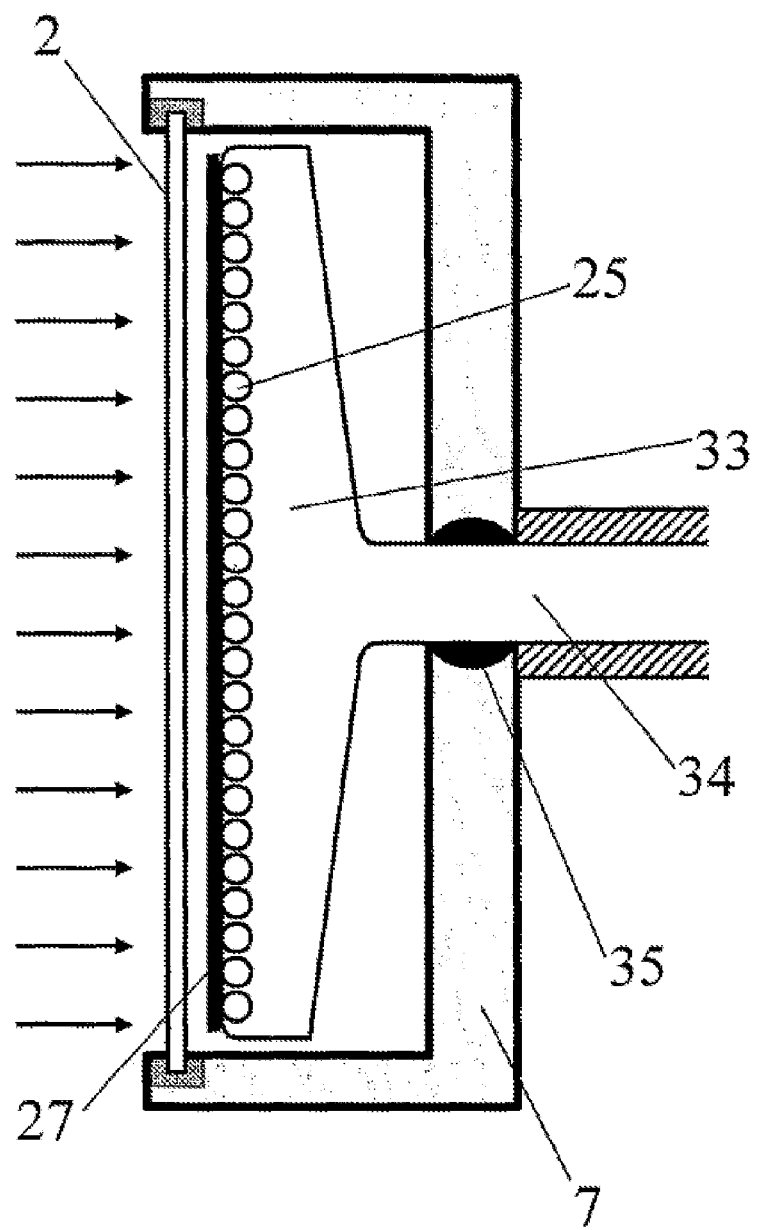
FIG. 10 is similar to the previous view and represents a variant of the previous embodiment in which a metallic screen for radiation absorption is added.

FIG. 10 is a variant of FIG. 9, in which a radiation absorption screen, 27, has been integrally joined to the front of the tube bundle 25, in order to improve the redistribution of the thermal load that strikes on the collector, which will not always be uniform.

Figure 11:
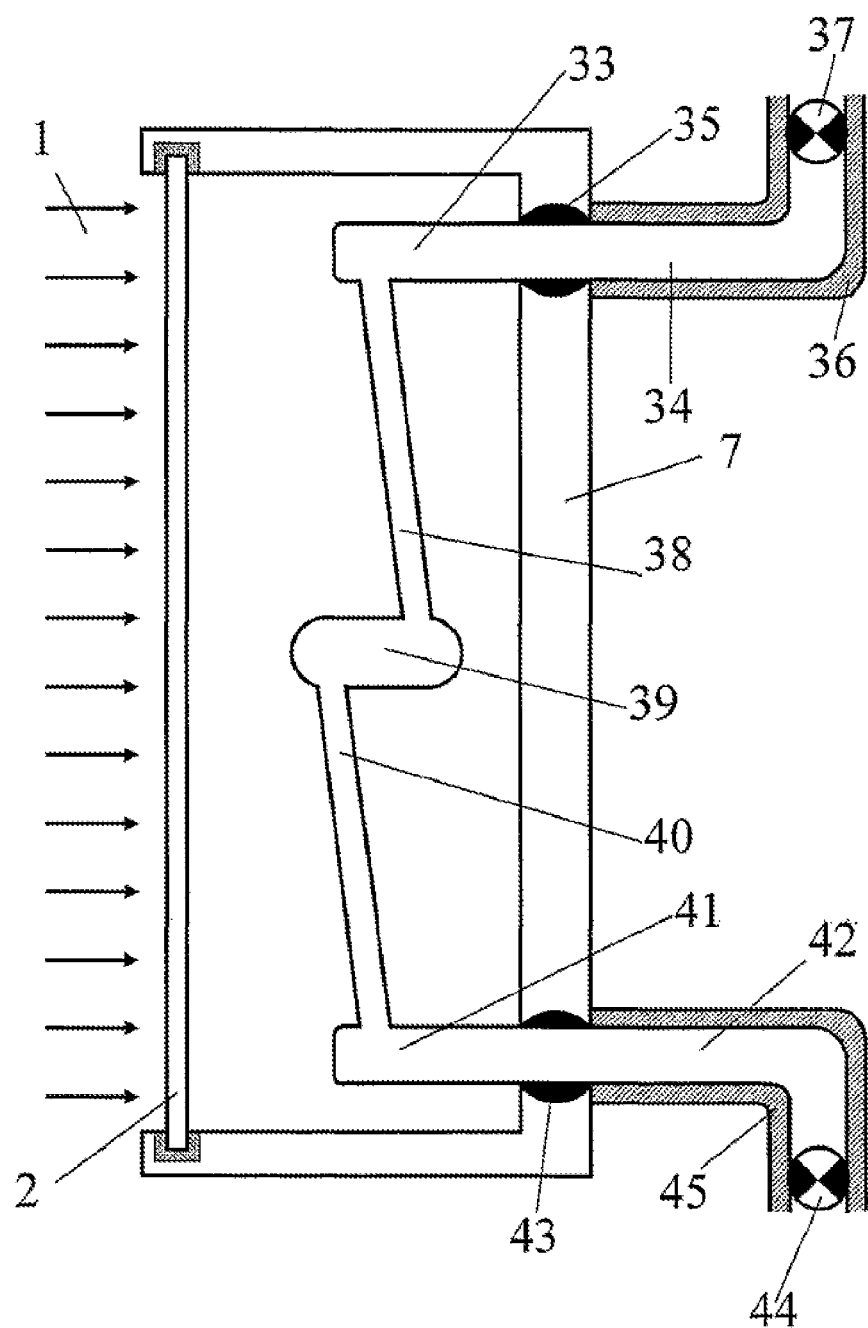
FIG. 11 is a vertical cross-sectional view of the embodiment of the collector of FIGS. 9 and 10.

FIG. 11 is a cross-sectional view of the assembly anticipated in FIGS. 9 and 10. This figure shows at the upper part the collector-funnel 33 which collects the ascending fluid, and channels it to the outlet conduit 34, which has a shut-off valve, 37. But at the same time, it can be seen that the heat-conducting fluid has ascended to the top of the component 38. This corresponds to a matrix or body through which the heat-conducting fluid flows, designed in this case for fitting into the modality presented in this figure, which is characterized in that the tubes have an oblique gradient towards the lower and upper fluid collectors or distributors, in order to better accommodate expansions and contractions. The matrix may consist of a bundle of tubes like those of the component 25, or a flat surface panel like the component 28, but always with a slightly oblique arrangement towards the heads at the beginning and at the end of the fluid path, represented by the collector 33, the redistributor 39 and the distributor 41, all of them generically called heads.

In this assembly the heat-conducting fluid enters through the conduit 42, which may be closed by means of the valve 44, if this circuit needs to be hydraulically closed, and it is insulated by the thermal insulator 45. The conduit 42 rests on the rear wall 7, thanks to the seal 43. The fluid ascends vertically from the component 40, which may be a tube bundle like 25, but with an assembly slightly oblique to favor the accommodation of expansions and contractions; or an external, also oblique, flat surface panel as the 28. In any case, the upper part of 40 is connected to the tank 39 in an airtight manner, usually by means of welding, where the flow is redistributed, balancing the temperature. From the tank 39 the flow continues ascending, in this case through the upper fluid passage matrix, 38, until it reaches the collector-funnel 33, which will send the heat-conducting fluid towards the exterior of the box 100, through the conduit 34, already presented in the previous figures.

Figure 12:
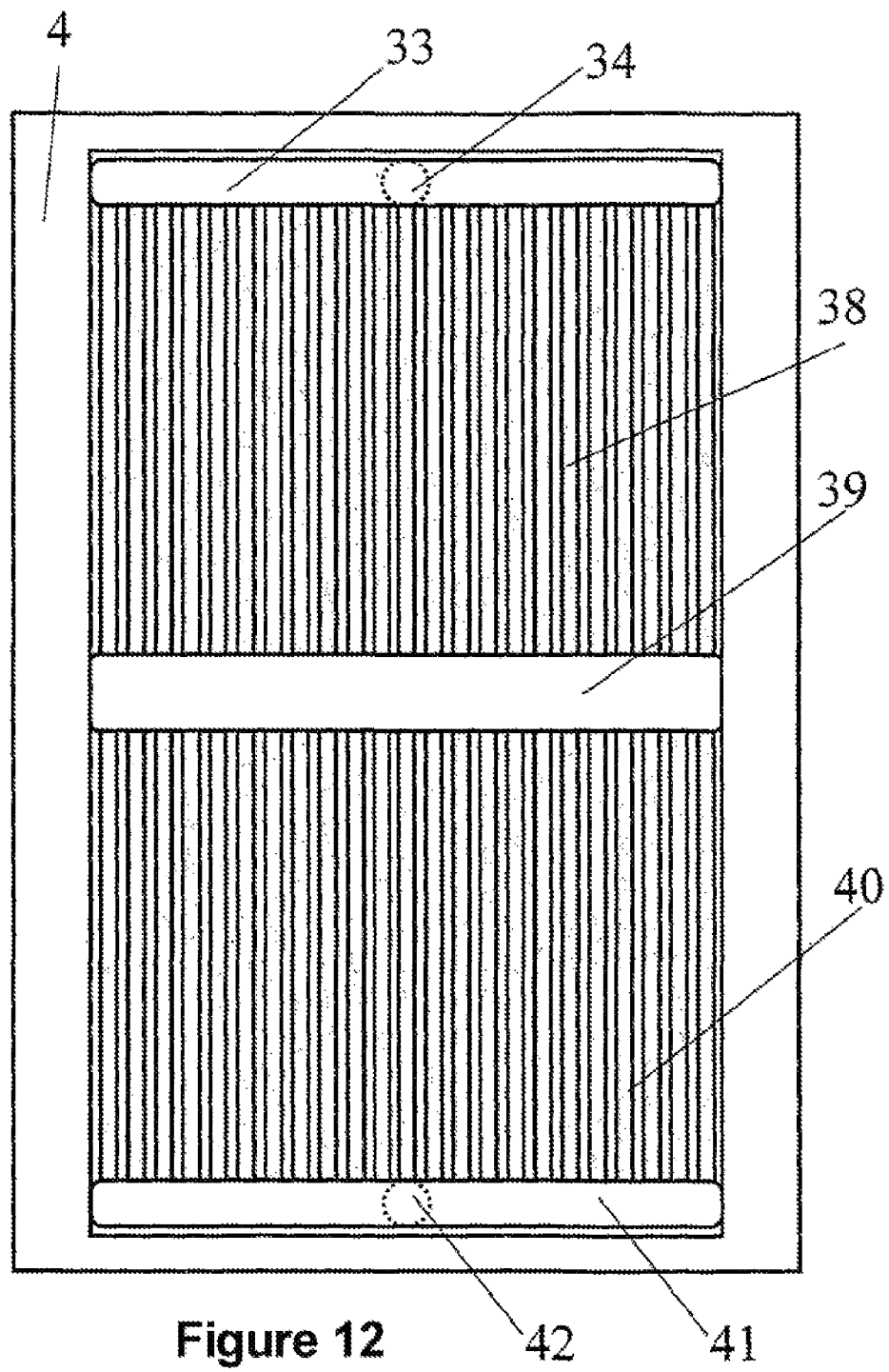
FIG. 12 shows a front view of the embodiment of the collector of FIGS. 9, 10, and 11.

FIG. 12 shows a front view of the assembly of FIGS. 9, 10, and 11, framed in the front facade 4, painted or with a layer having a very high radiation reflectivity adhered to it. In this case both the lower part of the fluid passage matrix, 40, as well as the upper part, 38, are represented by a tube bundle, but they may also be configured as a panel like the component 28. At intermediate height there can be seen the redistribution tank 39, and on the upper part the collector-funnel 33 and the broken line (straight section) of the conduit 34.

Figure 13:
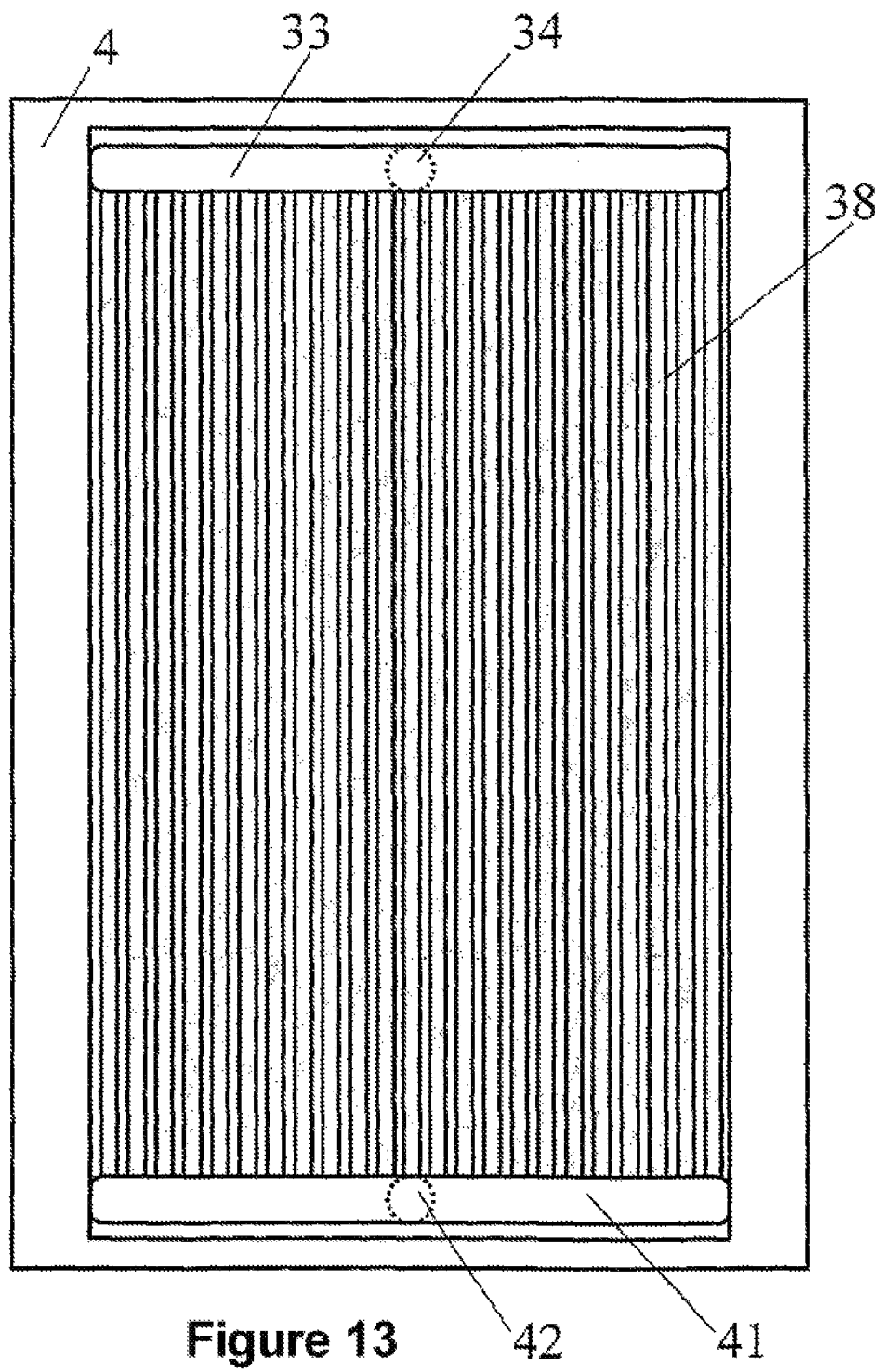
FIG. 13 is similar to the previous figure, but without the intermediate redistribution tank.

FIG. 13 is analogous to the previous one, but in this figure the intermediate redistribution tank has been removed, for the sake of simplicity, and the tube matrix, 38, runs in this case from the bottom up without interruption, from the distributor 41 to the collector-funnel 33. It has to be remembered, as it is evident in FIG. 11, that the tubes, or the panel, which will form the matrix, must have certain inclination relative to the corresponding upper and lower heads, to accommodate the expansions and contractions well.

Figure 14:
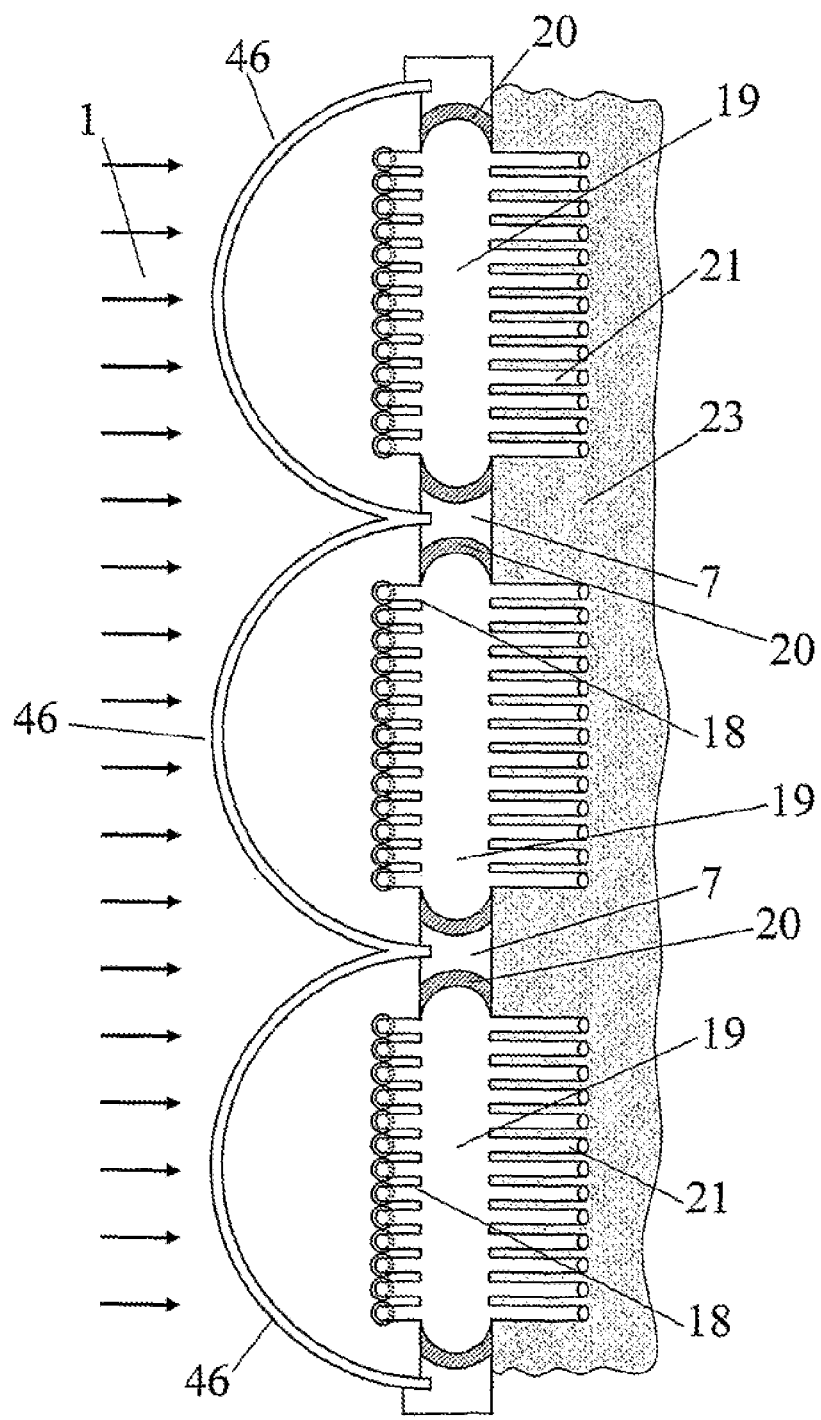
FIG. 14 shows an embodiment similar to that of FIG. 7, in which the transparent cover is replaced by a vault for each one of the collecting tube sub-bundles.

FIG. 14, which is analogous to FIG. 7, approaches the solution to an aforementioned problem: the strong mechanical stresses that the transparent cover will withstand due to the pressure difference between its two faces. In order to ease these stresses, curved covers can be used with a concavity towards the interior of the box 100, which works better under compression, and this can be seen in that figure, with the cover 46. This cover has been represented in this case as an set of semicircles, which correspond to the straight sections of semi-cylinders or blocks whose generating lines run parallel to the tubes, as the block is the geometric shape that has a better performance for withstanding the pushing force of the external pressure, when there is a vacuum or very low pressure in the interior. For that purpose, the tubes sub-bundles 25 arrangement has been used, presented in FIG. 7, since the reduction of the span to be covered by each longitudinal glass block, the pieces 46 of FIG. 14 can be described as such, provides greater robustness to this arrangement.

Figure 15:
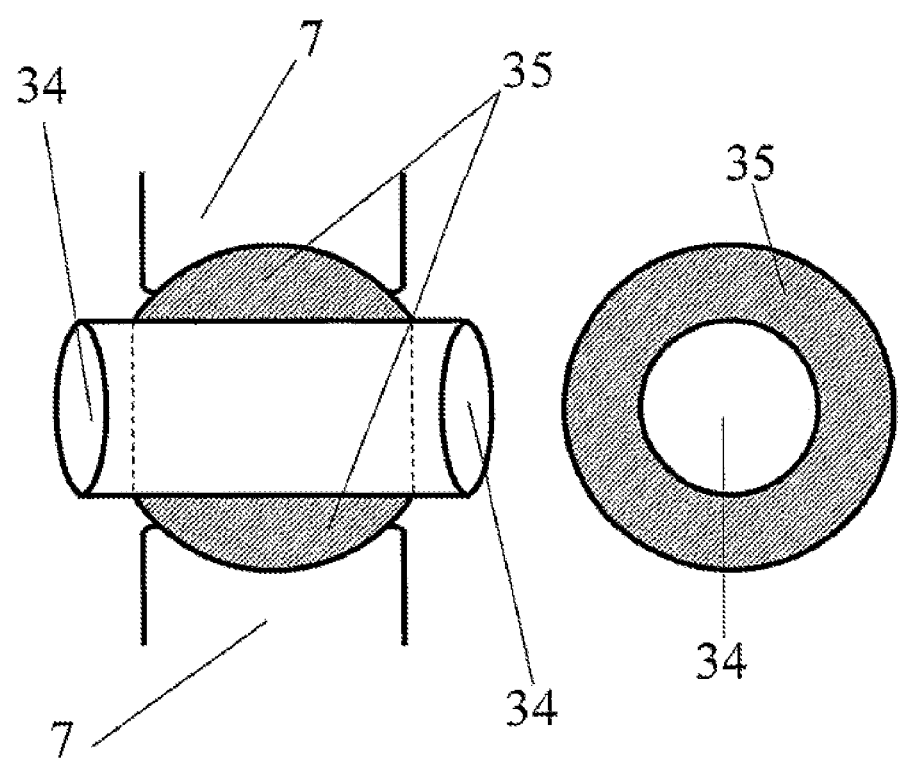
FIG. 15 represents a particular embodiment of the airtight spherical seals provided on the rear wall of the box.

In FIG. 15 the type of seal used to hermetically go through the rear wall 7 of the box 100 of the collector, according to the assemblies of FIGS. 9, 10 and 11, particularized, in the numbering, for the upper conduit is detailed. This figure shows the wall 7, on which a spherical recess is performed to house the seal 35, which is a sphere in which a cylindrical hole has been made, having one of its diameters as an axis. In said hole the tube of the conduit 34 will be housed.

Figure 16:
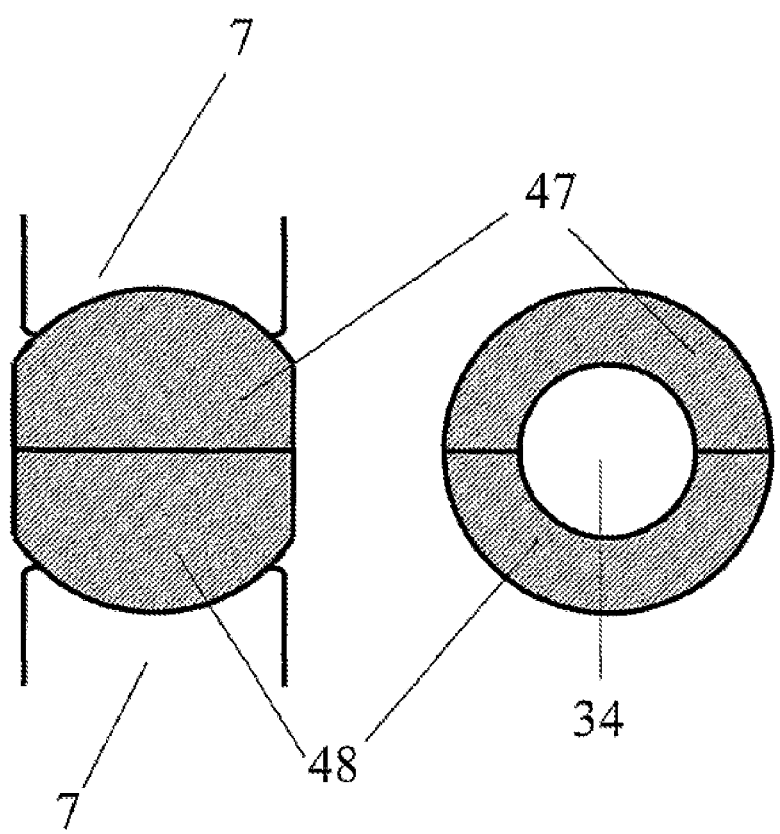
FIG. 16 shows an alternative embodiment of said airtight spherical seals of the rear wall of the box.

In order for the mounting to be more simple, the arrangement of FIG. 16 is proposed, in which the original sphere 35 is divided into two halves, before or after making the cylindrical hole to house the tube 34, which in this case may be surrounded by both semispherical sides, 47 and 48, in a way that is more simple than making the tube to go through the hole. In this case there is also the pressure produced from the outside to the inside of the box 100, due to the pressure differences.

Figure 17:
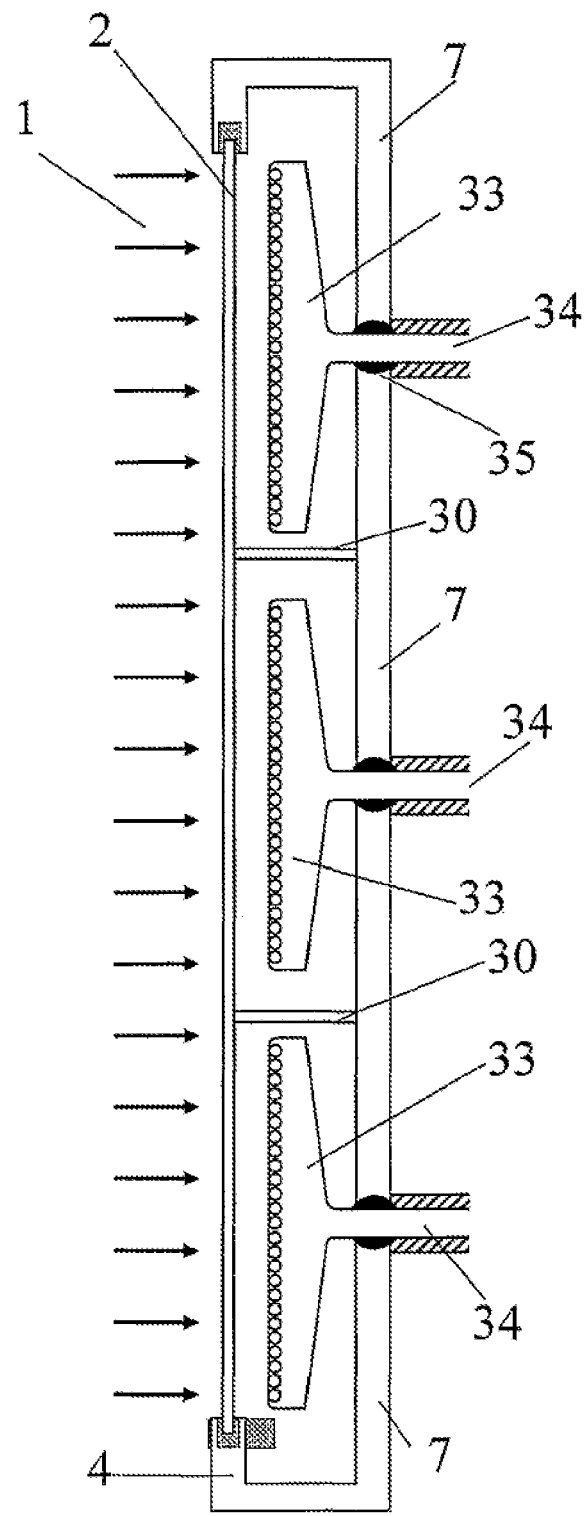
FIG. 17 is a view of an embodiment similar to that of FIG. 7, but in this case using the collecting funnels.

FIG. 17 shows a solution for providing the transparent cover 2 with greater resistance, similar to the one shown in FIG. 7, but in this case for the assembly presented in FIGS. 9, 10 and 11. This mounting has the advantage that it produces less disruption of the wall 7, which will be drilled, for the passage of the fluid tubes, to a lesser extent. FIG. 17 shows the elements 30, optionally made of the same material as the transparent cover, or of a high reflectance metallic plate, arranged in parallel to the bundles of tubes or panels of the matrix for the passage of fluid. The elements 30 rest at their edges on the rear wall 7, and on the other hand on the cover 2, thus receiving part of the pressure generated on the transparent cover (another part is withstood by the frame 3 of the cover, in its embedding to the front wall 4).

Even with the help of the intermediate supporting pieces 30, the problem of the structural resistance of the glass cover is complex, especially if the use of a very large surface is desired. For this reason it could be advisable to maintain certain pressure value in the interior of 100, which may eventually be equal to the surrounding atmospheric pressure, which would even cancel the mechanical stresses on the cover, and thus ensuring the durability thereof. But this will mean maintaining gas in the interior, which entails two serious problems; the chemical attack to the coat of paint or the high absorptivity adhesive layer which must cover the external surface of the tubes or solar radiation absorbent panels, and the increase of heat losses by convection, since the internal gas develops convection currents that would heat up the glass, which, in turn, creates another problem: the passage of a considerable flow of heat through the glass would generate higher temperature on its internal face than on the external one, and this temperature difference would give rise to thermally generated mechanical stresses, which could also break the glass.

With regards to preventing the chemical attack, the solution is to use in the interior of the box 100 an inert gas, such as nitrogen or carbon dioxide, but not air or any other compound having an oxidizing agent. But to this it a considerable problem is added, which, mechanically, may be even greater than the original problem of the atmospheric pressure: and it is the fact that the gas pressure in the interior of the box 100 will not be constant, rather it will depend on its temperature, which will be the environmental one when there is no sun, but which will be much higher when the panel receives the concentrated solar radiation. In absolute temperature, we are referring to going from less than 300K to more than 900K for many applications, and even more. This will mean that the pressure will be multiplied by 3, so that if it was at a pressure of one atmosphere when cold, when it gets hot it will be at 3. This would generate huge internal mechanical stresses on the glass, which it would hardly withstand.

Figure 18:
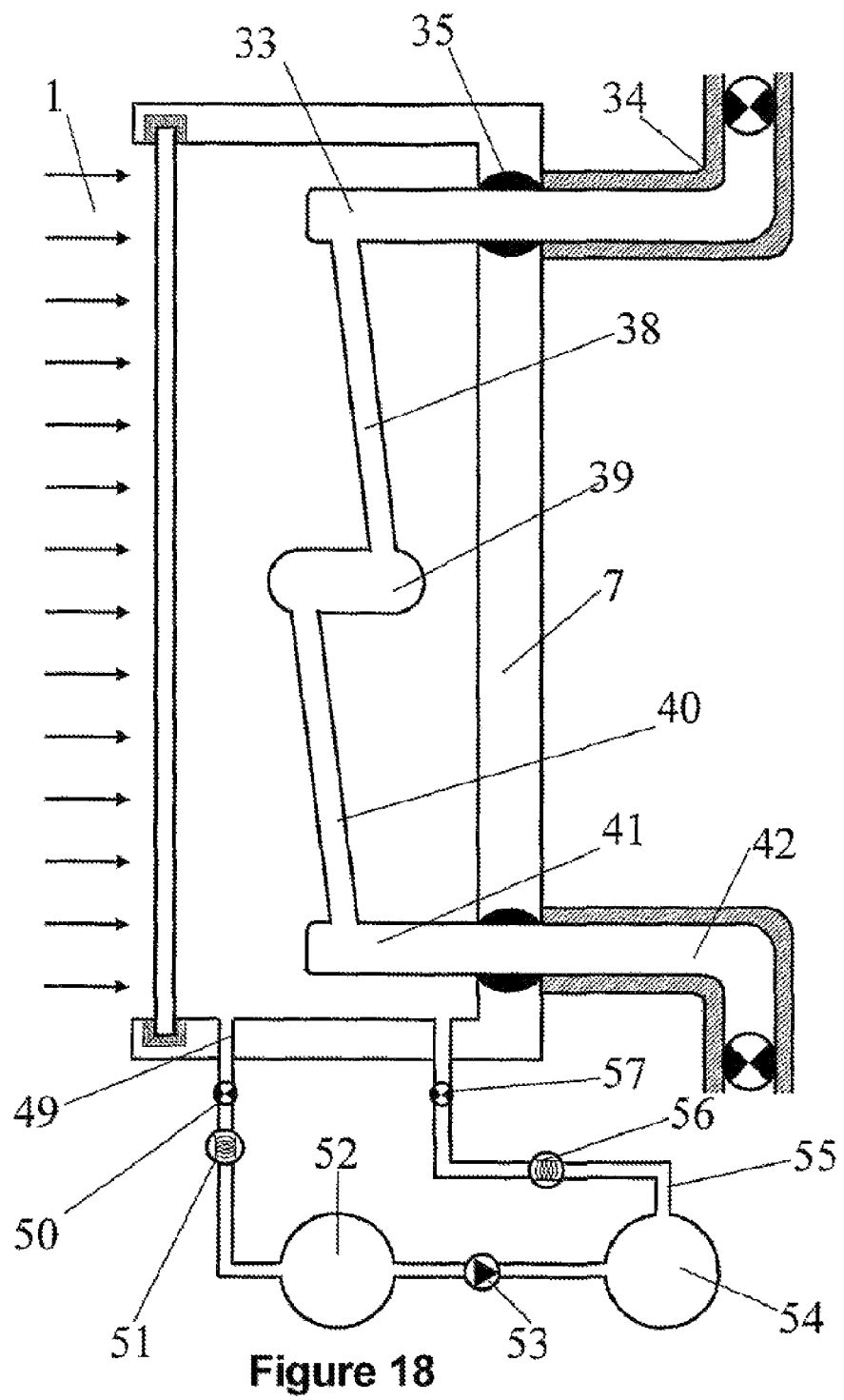
FIG. 18 represents a particular embodiment of the invention in which an inert gas in the interior of the airtight box and a pressure control circuit are used.

The solution to this problem is presented in FIG. 18, which shows a system of tubing, valves, tanks and a compressor whose operation allows maintaining the pressure inside the box 400, at the required value, which will typically be that of the surrounding atmosphere. To that effect there is small gas extraction tubing, 49, whose flow may be stopped by actuating the shut-off valve 50. This valve will usually be opened, and the flow passage control will be effected by an additional valve, 51, which is operated by pressure difference, and with a unidirectional passage. With this purpose, conventional mechanical or electromechanical valves can be used, the former being tarred according to the force of a spring that closes the gas flow from the box 100 to the outside thereof. This valve may be similar to the ball and spring type valves that close the gas flow from the butane bottles and the like. If the pressure of the box 100 equals or slightly exceeds the surrounding atmospheric pressure, the spring gives way, and the gas passes from the interior of the box 100 to the tank 52. In the electromechanical case, the electronic measure of the internal gas pressure is performed thanks to a pressure-electric signal transducer, and if this exceeds the prefixed level, the electric control of the valve orders its opening, until the pressure signal lowers until it is stabilized with that of the exterior. The gas thus escaped, by means of one or other valve 51 opening procedure arrives at a reservoir or tank 52, which will be called low-pressure tank, since it will always be below the external atmospheric pressure. For this to be always possible, there must be a compressor, 53, which takes the gas excess from the tank 52, when the pressure thereof rises above its nominal level, and it approaches the atmospheric pressure more than it is allowed in the design, and transfers it to the high pressure tank, 54. From this tank, the gas may come back to the interior of the box 100, as it colds down, and thus decreases its pressure. For that reason there is a tubing 55, in which there is a valve which is activated by pressure difference, 56, similar to 51 but with another operation system, and a hydraulic shut-off valve 57. Specifically, the object of the valve 56 is to inject gas inside the box 100 when its pressure is lower than the atmospheric one. Its control may be performed by pressure electronic measurement, and electromagnetic actuation, which nowadays is often the most reliable one, or by spring valves, with a control system similar to the ones that keep the pressure constant in the gas supply to butane stoves, or keep the pressure in the breathing nozzle used in scuba diving with compressed air bottles. In any case, these valves are not part of the invention, but the circuit as a whole to keep the pressure constant inside the box 100, which cancels the mechanical stresses on the transparent cover, generated by the pressure difference between the exterior and the interior, is part of the invention.

There remain, however, the mechanical stresses induced by temperature difference between the faces of the same body. The origin of these stresses is simple: the hotter part tries to expand more than the average of the body, while the colder part tries to expand less than this. But in a plate such as the transparent cover, the deformation has to be practically the same, since there may not be a significant displacement of some molecules relative to the others; and this generates tensile stresses on the cold external face, and compressive stresses on the hot part, with the maximum value on the hot face. For glass, tensile stresses are particularly harmful, suffered by the cold part. If we call the temperature semi-difference between both faces "D", the linear expansion coefficient of the material expressed in 1/K "A", and its Young's modulus or tensile modulus "E" (admitting that the elastic field is not exceeded, since if it is exceeded, it would certainly break the cover) the maximum stress "R", in absolute value, acquires the value $$R=E*A*D$$

In general, it will not be possible to admit that the R/E quotient be greater than 0.001, and even a limit value of 0.0001 can be set, to have a safety margin, which means that the product of A*D is limited to that quotient. According to the type of glass, the expansion coefficient will be between 10-6 and 10-5 K-1, therefore the temperature semi-differences supported between the faces must be limited to 100 K in the case of a type of glass with low expansion, and 10 K for those types of glass with higher expansion.

In turn, these differences have an impact on the maximum heat flow that may be admitted through the cover, which will follow Fourier's law, which can be expressed on the basis of the semi-difference temperature "D" between both faces, the glass thickness "V" and its conductivity "C". The maximum allowable heat flow "Q", in watts per square meter of glass surface, which would produce said semi-difference "D", would be $$Q=2*D*C/V$$

For a cover which is 0.01-meter thick, and with a 1 W/(m.K) conductivity a 25K representative semi-difference, would give a 5,000 W/m2 maximum allowable flow.

This flow impacts, in turn, on the maximum temperature difference that may exist between the internal gas of the box 100 and the external air, since Fourier's law and Newton's law of convection will be complied with, for the thermal system as a whole, formed by three successive layers of material: the convective layer for the external air; the glass panel; and the convective layer for the internal gas. Both this and the former will be characterized by their respective heat transfer coefficients. As indicative values we can take 20 W/(m2.K) for the external air, and 5 W/(m2.K) for the internal gas. If we call the maximum temperature difference that we can accept between the internal gas and the external air "M", with the aforementioned data, we would have that the value of M would comply with $$Q=(1/20+V/C+0.1/5)-1*M$$

Where, with the previous data assumed for C and V, it is obtained $$M=0.26*Q=1,300 K$$

Typically, the difference at operation conditions will be half the previous value, or less, which means that there is plenty of room for the mechanical stresses generated by heat differences on the glass cover to remain within the elastic regime, and thus they will not generate permanent defects or break the cover. Thus, the assembly proposed in FIG. 18 is absolutely applicable, from the constructive point of view, though from the thermal point of view it will have more losses than the vacuum panels; since in the latter convection will be practically inhibited. Against the vacuum panels the pressure difference may break the glass, unless it has a very small surface, which imposes very drastic conditions for the focusing of the concentrated radiation, since mirrors should not be so small, because in that case the heliostat, the supporting elements and the solar tracker set included would be very expensive.

An already commercialized alternative is using cylindrical glass sheaths for each tube, making the vacuum inside each sheath. The problem is that the device is expensive, since the ends of the glass sheath has to be welded to a strap which is in turn welded to the tube, to preserve the vacuum. The intermediate strap is needed to absorb the differential expansion between the glass and the tube. Together with this technical, economical and maintenance problem, there exist another one related to the capture performance, since the absorbent tubes cannot be almost tangent to each other, on the contrary, there must be space for the sheaths and vacuum, which makes part of the focused radiation to the collector not strike on the absorbent surface, which makes the net performance, on the light originally captured by the heliostat field, be adversely affected, and lower than it would be if the absorbent surface had occupied all the transparent cover opening.

The alternative proposed in this invention is not based on using absorbent tubes encapsulated in glass sheaths, integral to each other by the strap welded to both parts, but longitudinal glass blocks, inset into the front wall of the box 100 and, when applicable, into its rear wall, or even on edge pieces 30, but neither welded nor integral to the radiation absorbent tubes. By the upper and lower ends, the blocks will be inset, through their corresponding seal type 3, on the upper and lower walls of the box 100. This is particularly useful with the arrangement of sub-bundles of tubes 25, presented in FIG. 7, since the reduction of the span to be covered by each longitudinal glass block, provides greater robustness to this arrangement.

A key question to clarify is that the system for maintaining the pressure may serve many collectors in parallel at the same time, although each one may have a different development due to the internal temperatures, which will be taken into account in the gas extraction and injection control valves. Logically, the volumes of the tanks will have to be in line with the gas volumes of the boxes to be controlled, and so will the power of the compressor. Specifically, the volume of the low pressure tank 52 must be equal to the sum of the volumes of the interior of the boxes to which it is connected by standard tubes 49, in parallel between them, with standard valves 51 in each tube, reinforcing the casing of the tank 52 to withstand pressure differences equal to the atmospheric pressure; and having the high pressure tank 54 the same volume, although its casing is reinforced to withstand internal pressures that are at least five times the atmospheric pressure.

Figure 19:
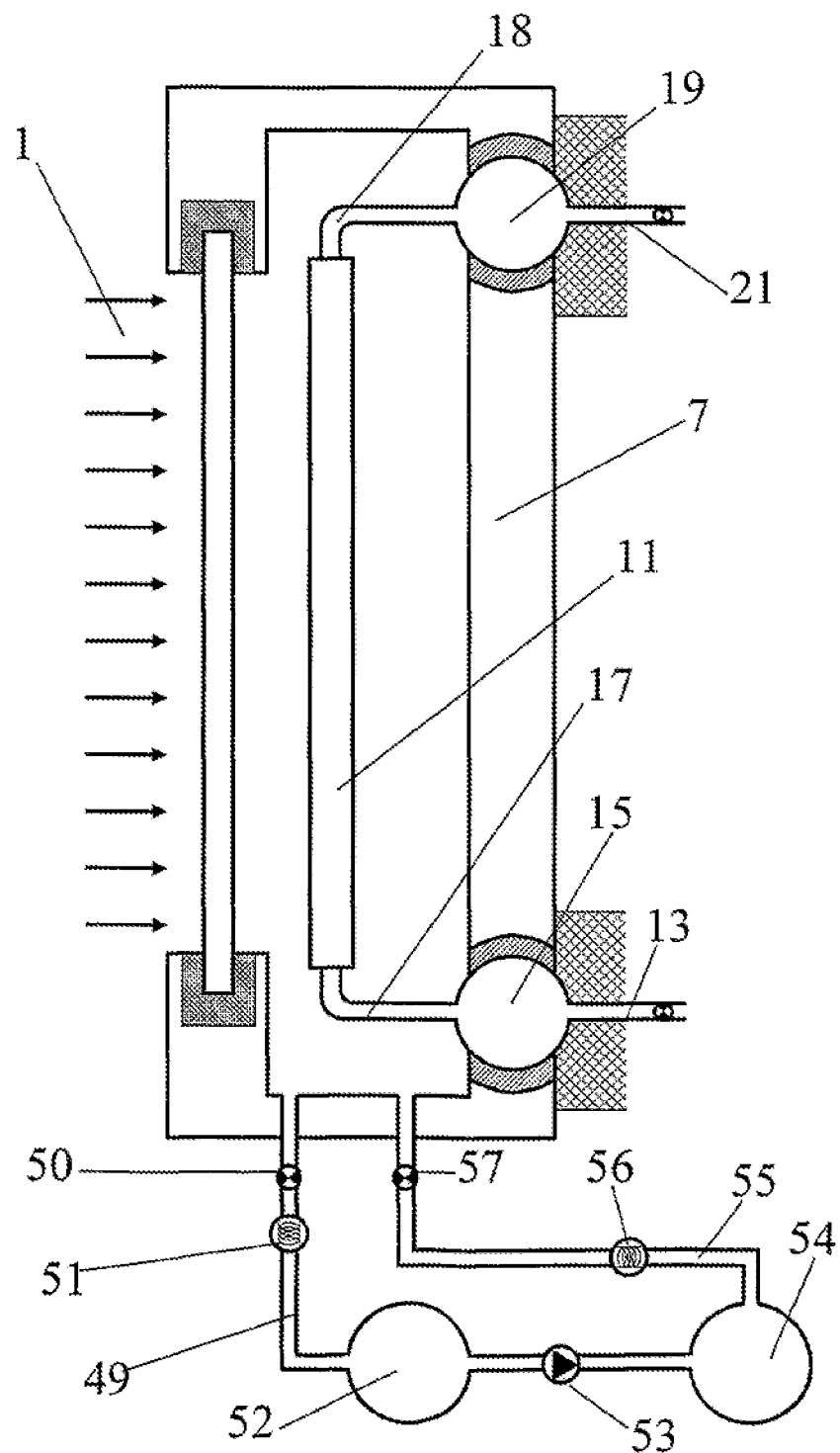
FIG. 19 shows an assembly of a pressure control circuit similar to that of FIG. 18, in this case applied to the collector of FIGS. 1 to 3.

FIG. 19 shows an analogous pressure control assembly, applied in this case to the collector configuration given in FIG. 1. Obviously, the system, that helps prevent unacceptable mechanical stresses on the transparent cover, due to pressure differences, may be applied to any assembly herein described, and to any other one that uses or needs a transparent cover, if only used to prevent the air oxygen from attacking the paint or the high absorptivity coating of the heat-conducting fluid passage matrix.

There remains, however, the problem of some excessive losses by convection through the glass panel. They may be reduced by leaving little space in the box 100, so that the internal inert gas does not have a large volume to be able to develop. This has limitations, since the box 100 will have to have enough space to be able to house the bended tubes 17 and 18 in assemblies like those of FIG. 1, or heads such as 33 and 41 in the assemblies such as those of FIG. 11. Please note that the horizontal length of the tubes 17 and 18 is important to accommodate the expansions and contractions of the fluid heating body or matrix, 11. It is also true that in the movements to absorb those variations, the arrangement effected of tanks embedded into the rear wall, designated with 15 and 19 in FIG. 1, does help. Furthermore, the slight rotation of those tanks inside the seals is transmitted to the corresponding external tubes, 13 and 21 respectively, which allows to better accommodate, in turn, the deformations of the latter, since they also expand when heated, and contract when cooled down, being the deformation movements produced in a regular way, which facilitates the compensation of expansions and contractions, but prevents the box 100 to be made as narrow as desired, for what was said as regards the tubes 17 and 18.

Figure 20:
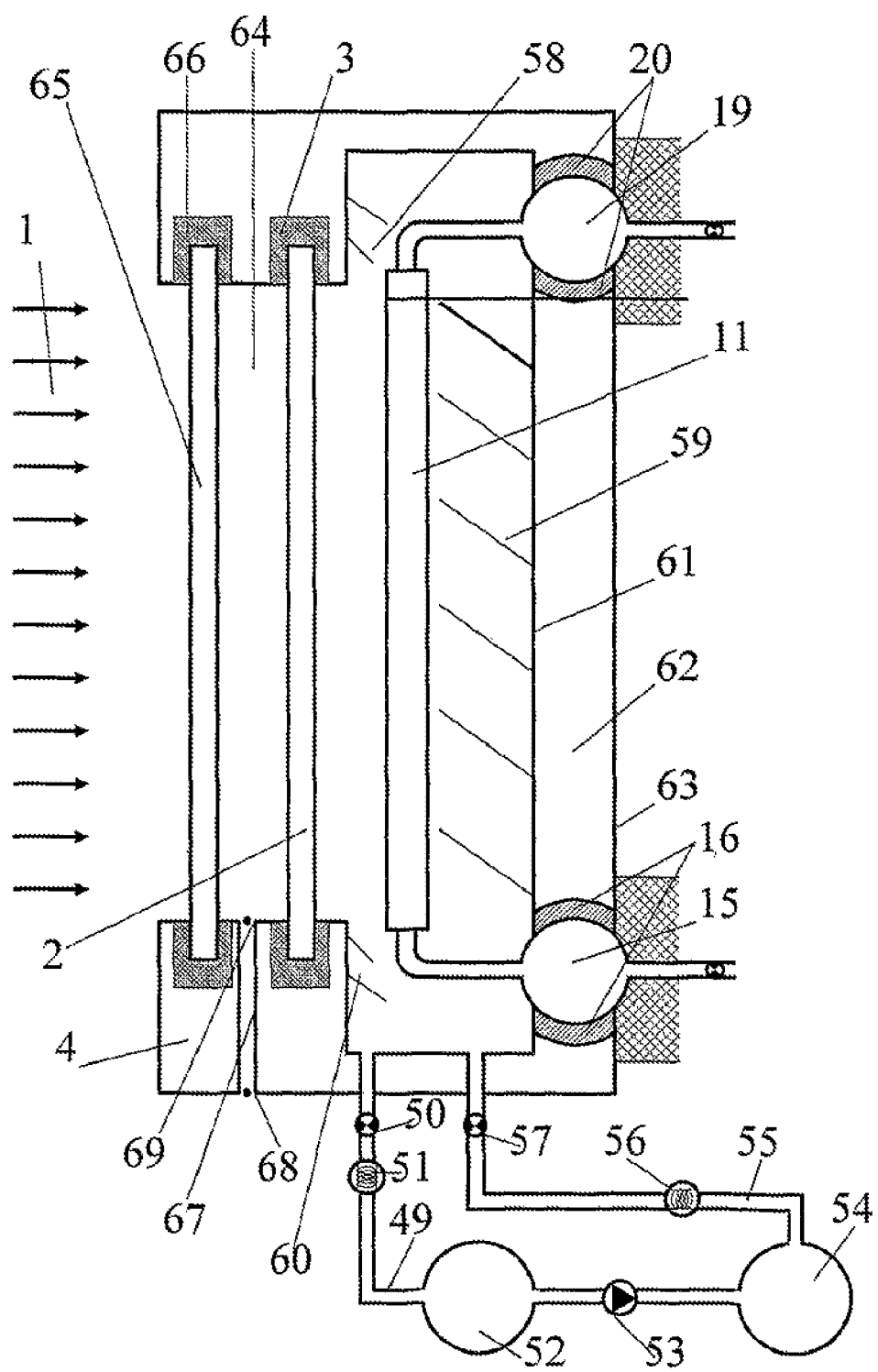
FIG. 20 shows a collector similar to that of the previous figure, in which an additional transparent cover is provided.

FIG. 20 shows the two proposals of this invention devised for effectively reducing the heat losses by convection through the transparent cover (which may not be insulated as the rest of the walls of the box 100 are insulated).

On the one hand the internal heat transfer coefficient is reduced, incorporating some elements that hinder the development of convective currents inside the box 100. These are developed due to the rise of the gas which is heated at the front part of the box 100, where the absorption surface is, which will be the hottest part, and will tend to descend through the rear part of the box 100, which will be the coldest one. To that effect some kind of fins or tongues are placed hindering those movements, and corresponding to the elements 58, 59 and 60. These fins may be made of the same material as the internal wall 61, and like this wall, they must be painted or covered with the layer 8, which must have high radiation reflectivity. The fins must have the inclination described in the figure, which is approximately about 45° degrees relative to the wall to which they are joined, in order to more efficiently counter-act the convective movement of the filling gas.

On the other hand, the heat transfer coefficient will be reduced from the external air side, to this end, the invention consists of having a double glass panel, but not having the internal vacuum that is usually found in the cases of a small glass surface, rather having a mechanism so that in its interior there always exists a pressure that is equal to the surrounding atmospheric pressure, which, in turn, is the one that will be in the interior of the box 100, which will eliminate the mechanical stresses generated by pressure differences. It should be noted that a 10-m2 glass panel having a 1 atmosphere pressure on one face, and vacuum on the other, would withstand a 100-ton load. Hence the importance that the two covers proposed to reduce the losses by convection through the exterior are separated by a small air span always at atmospheric pressure, but without internal convection, for which it has to be a very thin space, though it seems to be very thick in FIG. 20, since the desired clarity in the drawing prevents it to be made to scale. Said space, 64, is at the exterior part of the cover 2 which closes the front of the box 100, and, in turn, it is confined on the exterior by a second cover 65, having similar characteristics, almost identical, to FIG. 2. The cover 65 is inset in the front wall 4 by means of the frame provided by the seal 66, similar to the seal 3.

The pressure in the interior of the space 64 is kept equal to the surrounding atmospheric pressure because it is connected to the surrounding air through a small hole, or set of holes, 67, which bore the lower part of the front wall. Through those holes the pressure is compensated, since in case it rises in the space 64, the air molecules would tend to go out through the holes, and conversely in case of cooling. Certainly, along the holes there will be a small loss of pressure, therefore it would take time for the pressure to get balanced, but the pressure decompensation would be small, about tens of Pascals, which would represent very small mechanical stresses on both covers, 2 and 65.

An important issue to be anticipated is that the covers should not get dirty on the space sides, which means that insects and dust must be prevented from entering through the holes. For this purpose, some mosquito net-type filters, as it is schematically shown in the elements 68 and 69, must be arranged at the end of the holes.

Figure 21:
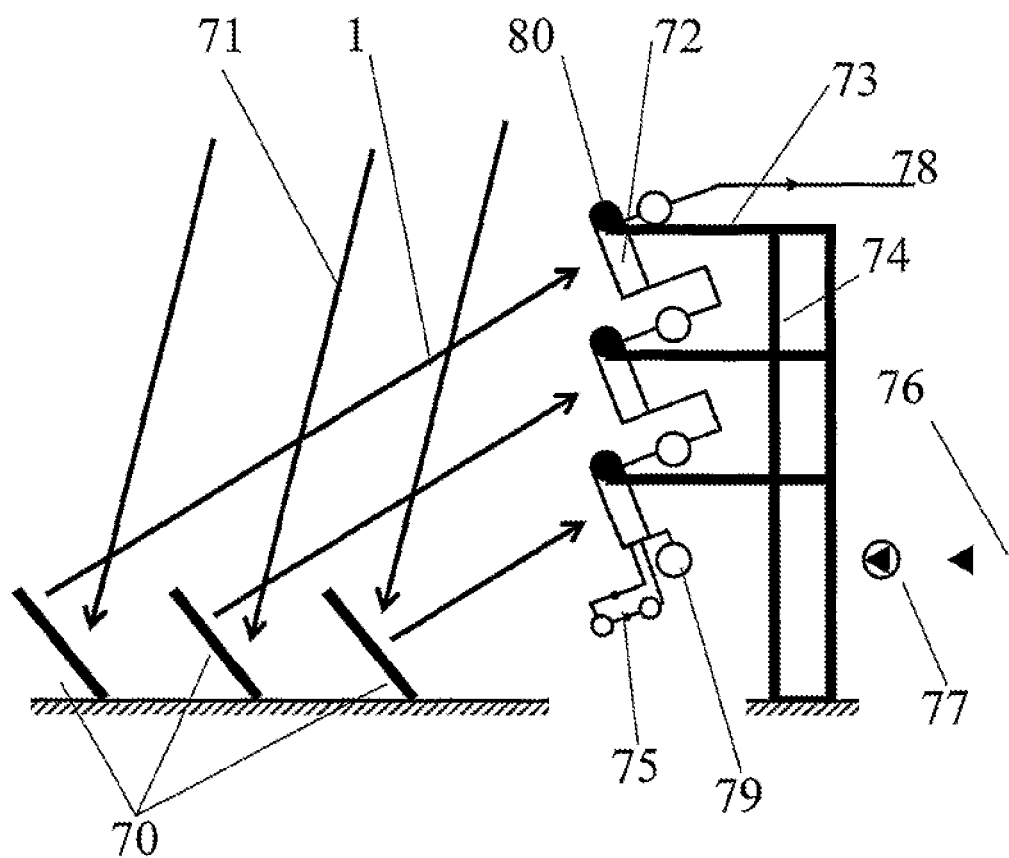
FIG. 21 schematically represents an assembly of several collectors object of the present invention before a field of heliostats for obtaining thermal energy.

FIG. 21 shows a schematic view of the constructive arrangement these collectors may take to fulfill their purpose. For this purpose, there must be a field of heliostats 70. Although in the figure there is drawn one mirror directed to each collector, in principle there would be one or several rows thereof, which would make the reflected light strike on a collector, so that the surface of the mirrors striking on one collector would be 100 times, and more, the absorbent surface of the collector. In the figure it is represented the direct solar radiation 71, and the one that strikes on the collectors, 1, which may be 100 times, or more, the original intensity 71, according to the concentration. Each collector as a whole, 72, would be hung, as it would be seen in a subsequent figure, from the branches 73 of the structure 74, which as a whole supports the installation of solar collectors. This structure may be made of metal or reinforced concrete, and will essentially have columns and beams, between which there will be some special ones, the aforementioned branches, 73, from which the collectors hang. According to the chosen assembly, they would carry the pressure compensation system, 75, associated with them, which in the figure is, for the sake of clarity, only represented joined to the lower collector, but which may serve them all, in each case with their corresponding valves, type 50, 51, 56 and 57.

The heat-conducting fluid would arrive at the installation, from the energy conversion block or the useful application, through the tubing 76, and would receive the impulse of the pump 77 to overcome the loss of manometric height of the circuit that it will travel, until it goes out through the tubing 78, with a temperature much higher than the one of entrance. In this circuit there would be tanks, 79, for homogenizing the temperature of the fluid parallel branches that may exist, and absorbing transient-induced speed and density variations. Although it is not represented in the figure, the tanks 79, as well as the tubing 76 and 78, and the pressure compensation system 75, will be thermally insulated, to prevent losses, which is not a part of the invention.

In the figure there must be highlighted the elements 80, which are the pieces from which the collectors are hung, which are integrally joined to the structure, but may expand freely as a whole. The pieces 80 are assembled to the lugs 81 represented in FIG. 22, and of which there are two, one at each side of the upper part of the box 100 of the collector, welded or screwed to the upper external wall. The assembling may be made by welding, but in FIG. 22 there has been represented the lugs 81 with drilled holes 82, which may be the simplest anchoring way, by means of through screws and nuts.

Figure 22:
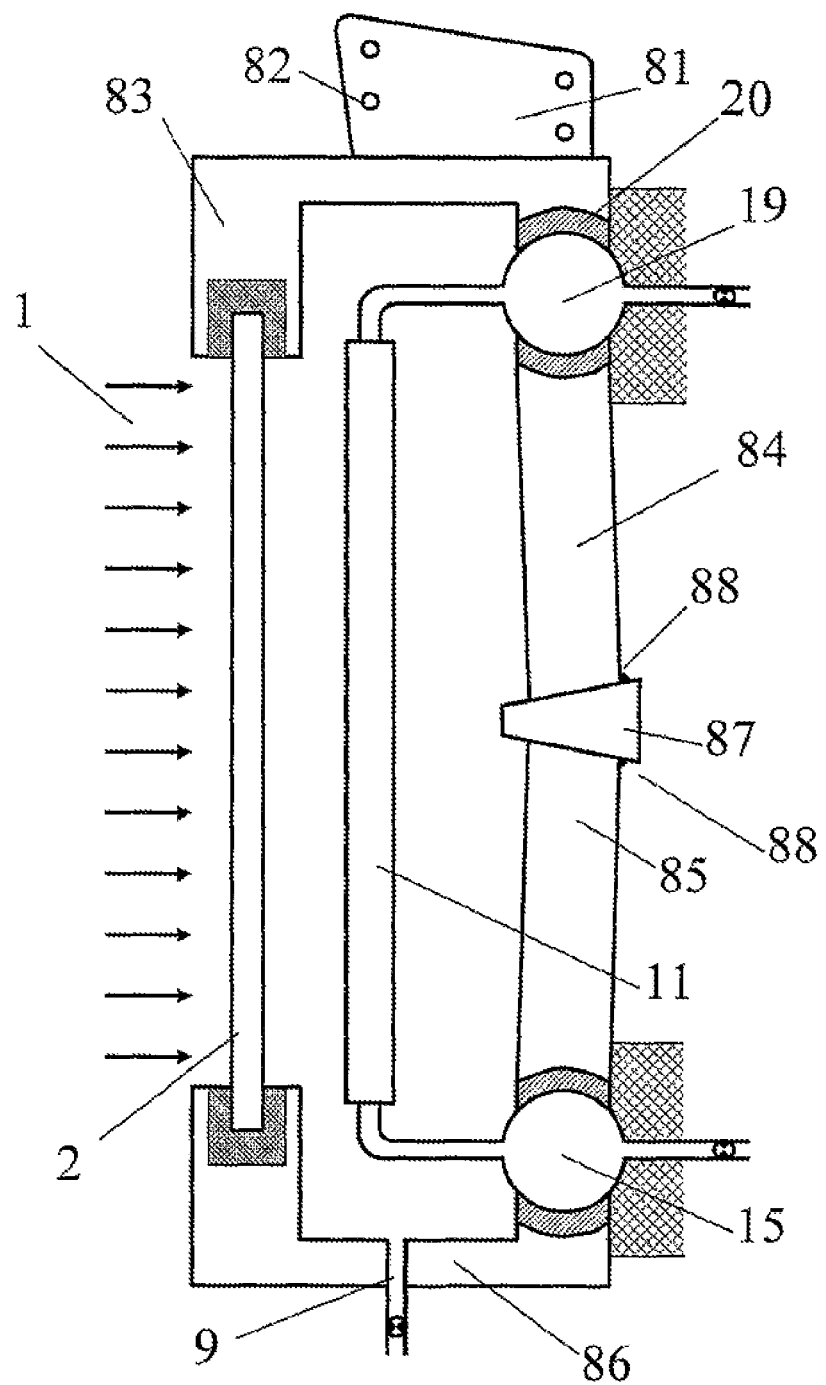
FIG. 22 shows a collector object of the invention with assembling elements for its mounting according to an arrangement as the one represented in FIG. 21.

FIG. 22 is also useful for explaining the assembling method of the collector assembly. It should be noted that this will be constituted from individual pieces such as the ones marked with the corresponding numbers in the preceding explanations, a part of which may be previously welded or assembled, and this is the case of the circuitry of the heat-conducting fluid, from the inlet tubing 13 to the outlet one 21, if this internal arrangement of the matrix 11 has been chosen, or alternatively from the conduit 42 to 34. The parts of the box 100 are prepared separately, which will now be identified, as well as the seals for embedding the tanks 15 and 19 into the wall 7, and the seal-frame 3 for insetting the cover 2.

The walls of the box 100, which correspond to a sandwich-type structure, with the filling thermal insulation element, and the metallic walls at each face, are prepared in four parts, numbered 83, 84, 85 and 86. The first corresponds to the upper quarter, and rests on the seal 20 of the tank 19, which level it reaches. At the front part it borders on the upper part of the seal frame 3. At the sides it may be simply chamfered or cut in a different way that favors its welding with the following quarter 84. And on the upper part it borders on the recess made to inset the corresponding seal, either 20 in an assembly type of FIG. 1, or 35, of FIG. 1. At that level the piece of circuitry embedded into the wall 7 will rest, either the tank 19, or the conduit 34, according to the type of assembly.

At the lower part the symmetrical operation is performed with the lower quarter, 86, the cover 2 being inset in the seal frame 3; and placing the seal 16, or the spherical seal 43 (according to the chosen assembly), on top of that piece 86, at its rear part, to subsequently rest either the tank 15, or its alternative, which is the conduit 42 on the seal. In this way it only remains closing the box 100 on the sides and the rear part of the two intermediate quarters, which also have a small tab at the front part, to inset the corresponding part of the seal-frame 3. The most important thing is closing the rear part, which will be hermetically inset the box 100, with the elements of the circuitry that go through that wall. For this, the two intermediate quarters 84 and 85, will firmly tighten those penetrations, with their respective seals, which is achieved as it is represented in FIG. 22, by coupling two parts with an intermediate wedge, 87, being the set higher than necessary, so that the wedge forces the intermediate quarters of the wall, 84 and 85, to tighten the elements inset into said wall. For the wedge not to be expelled outwards, it is welded along its whole length, which is also necessary to finish providing rigidity and airtightness to the system. In the figure the weld beads are schematized by the elements 88.

Figure 23:
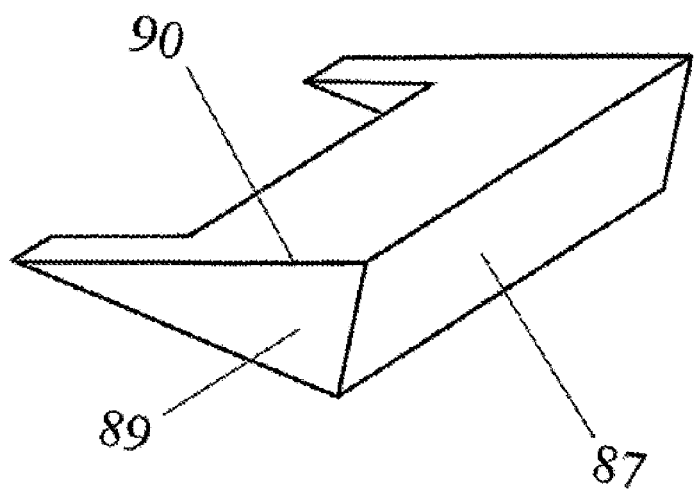
FIG. 23 represents in detail the assembling wedge shown in the previous figure.

The complete form of the wedge 87 is shown in FIG. 23, in which it can be seen that the wedge continues, until its angle is closed, over the side walls of the box 100 in which the welding will also be produced, along the edges 90, of the side 89, and its symmetrical one on the other side.

Figure 24:
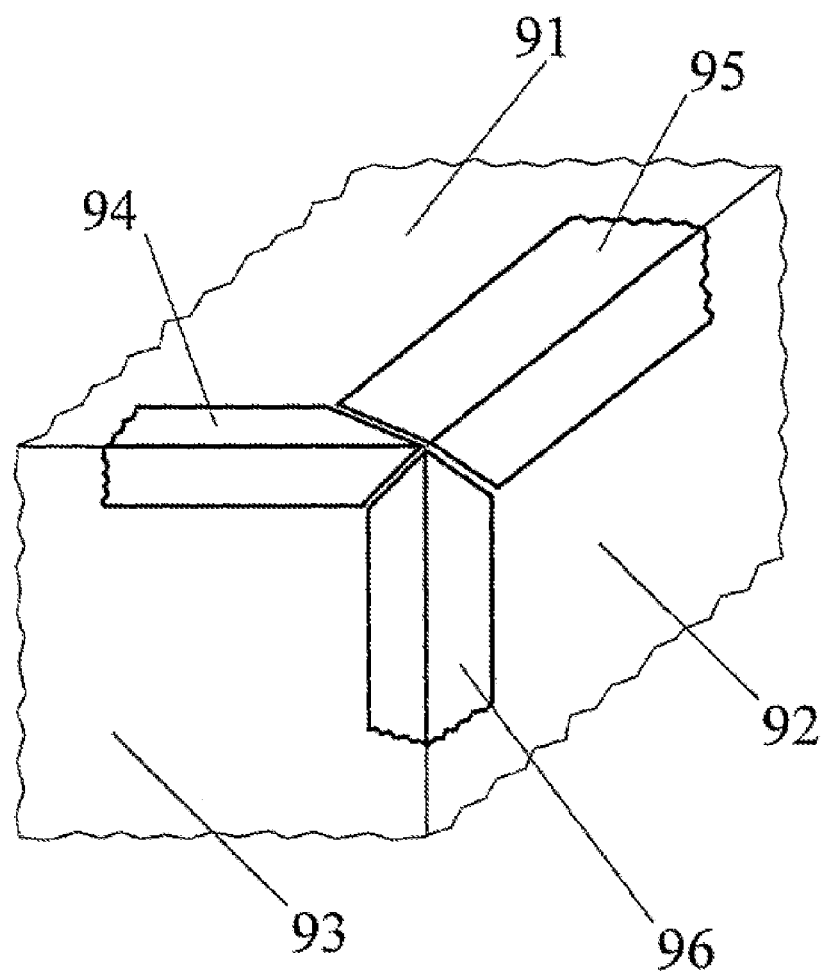
FIG. 24 shows the arrangement of angle joint bars to provide rigidity to the joints of the walls of the airtight box of the present invention.
Figure 25:
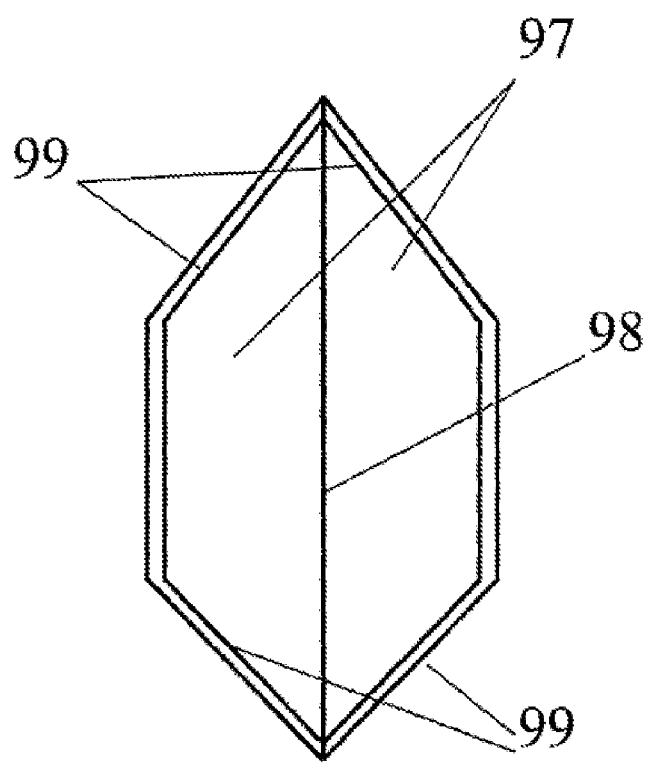
FIG. 25 shows the shape of the joint bars of the previous figure.

In view of the weight that the box 100 will have to withstand, and the small, but considerable, deformations generated by the expansions and contractions, it is suitable to reinforce the walls of the box 100, especially at the corners. To this end, the arrangement of FIG. 24 is proposed, in which the edges between the perpendicular surfaces are covered with an angle joint bar, having a resistance and thickness greater than that of the skin itself or external wall of the box 100, on which they will have to be mutually joined, preferably welded. Hence, the upper 91, rear 92, and side 93 surfaces represented in the trihedral angle of FIG. 24, have their edges reinforced, by pieces 94, 95, and 96. Similarly, it is performed at the symmetrical parts of the other trihedral angles of the box 100. Likewise, it is important, though it has not been represented in the figure, that the lugs 81 are welded on the reinforcement joint bars. The typical shape of these joint bars 97 is represented in FIG. 25 as a dihedral right angle 98, whose longitudinal ends 99 are chamfered, at 45° in order to be assembled with the other two joint bars of each dihedral angle, as they are brought together in the trihedral angles of the box 100.

Therefore, preferably, the invention may be performed from any solar energy absorbent channel or tube panel, meaning that it has a good mechanical resistance and good thermal conductivity, and that it can be painted, or covered with an adhesive, so that its surface has high solar radiation absorptivity, and a very low thermal emissivity. In the invention, one bundle of these tubes is vertically assembled in parallel, to constitute the matrix for the passage of heat-conducting fluid or main body, which will be heated as it ascends through the tubes of the bundle, 25, where the solar radiation 1 will strike, generally concentrated by the reflection of a field of heliostats 70 conveniently directed to fulfill said reflection (as shown in FIG. 21). Each one of the tubes of the bundle 25 will be, integrally, joined at their lower part in general by welding, to a tube, 17, having a slightly smaller diameter, and with a 90° bend that makes its other end be horizontal, and also integrally joined with a tank 15, from which on the other side, diametrically opposed to the connection of the tubes 17, tubes, 13, come out, forming the heat-conducting fluid inlet bundle to the collector in question; having said tank 15 a cylindrical body, and horizontally resting, with semispherical finishing pieces at its two ends, and said tank 15 being inset into a physically rigid facing wall, which will be called rear wall 7, and in which it is embedded by means of a seal 16 covering its whole volume, the seal being made of a solid thermal insulation material having good properties under elastic compression with allowable deformations in the range of 0.1%, and a melting point much higher than the heat-conducting operation temperature.

At the upper end of each tubes of the bundle 25, other tubes, 18, are integrally joined, having a slightly smaller diameter, and with a 90° bend that makes its other end be horizontal, and also integrally joined with a tank 19, from which on the other side, diametrically opposed to the connection of the tubes 18, tubes, 21, come out forming the heat-conducting fluid outlet bundle from the collector in question; having said tank 19 a cylindrical body, and resting horizontally, with semispherical finishing pieces at its two ends, and said tank 19 being inset into a physical rigidity facing wall, which is the rear wall 7, and in which it is embedded by means of a seal 20 that covers its whole volume, the seal being made of a solid thermal insulation material having good properties under elastic compression with allowable deformations in the range of 0.1%, and a melting point much higher than the heat-conducting operation temperature.

The set constituted by the heat-conducting fluid inlet tubes 13 (see FIG. 1), the tank 15 at which they arrive, the bended tubes 17 arranged into a parallel bundle, which go out from the aforementioned tank, and arrive from below to the vertical tubes, in a bundle as well, 25, which absorb the solar radiation, and which are connected from its upper end to the tube bends 18, which will end into the tank 19, from which the outlet tubes 21 emerge, constitutes the thermo-hydraulic circuit followed by the heat-conducting fluid, and is the basis of the invention, because due to the arrangement proposed, the expansions and contractions experienced by the materials as the temperature varies, are easily assimilated, without generating any unacceptable stress or damage in those structural elements.

The bundle of solar radiation absorbent tubes 25 (FIGS. 3 to 5), and their bundles associated with the lower, 17, and the upper, 18, bended tubes are located inside the airtight box 100 (FIG. 1, 20 or 22, among others) with walls comprising a resistant internal plate, 61, generally metallic, an external plate made of a similar material, 63, which as a whole provides rigidity to the system, and an intermediate layer or volume, 62, filled with a thermal insulation material; the box 100 comprising two distinct singular walls, which are the front wall, 4, in which there is an opening so that the radiation can go through, and said opening being occupied by a transparent cover 2, inset into the front wall 4, by means of a seal 3 that occupies all the perimeter of the opening; and the other wall being the rear wall, 7, in which the heat-conducting fluid inlet tank, 15, and outlet tank, 19 are imbedded, the airtight housing of the tanks in the wall 7 made possible by some seals, 16 and 20 respectively, in such a way that the aforementioned tanks may slightly turn inside their respective seals, when the expansions and contractions alter the length of all the tubes of the circuit, and also modify the angle of the bends of the tubes 17 and 18.

At the wall of the box 100, preferably at its lower part, 6, there exists a hole, 9, to be able to extract the internal air through it and leave the interior of the box 100 empty, by means of a suction compressor, there also existing a shut-off valve, 10, for said hole 9.

In the bundle of vertical absorbent tubes, 25, at half the height thereof, there may be a temperature homogenization tank 26 among the flow of the different tubes (FIG. 4). This is useful for balancing the thermal load carried by each tube, which may vary significantly among them, as it is not possible to ensure the uniform focusing of the radiation on the tube bundle. A possible alternative, regarding the assembly already described, is to place a metallic screen, 27, (FIG. 5) at the front part of the tube bundle 25, the screen being made of a high conductivity material, and painted or covered with an adhered substance having high radiation absorptivity and low emissivity, and the screen being integrally joined to the tube bundle, preferably by welding.

In order to prevent a considerable thermal load from being deposited on the walls of the box 100, which are not refrigerated and thus might reach a very high temperature, its external surface must be painted or covered with a layer having a high radiation reflectivity.

Similarly, in order to avoid undesirable thermal loads on the wall, the surface of the internal walls of the box 100 must be painted or covered by a layer having a high radiation reflectivity.

In an alternative assembly the tube bundle 25, as the matrix or main body for channeling the passage of the heat-conducting fluid, there may be a continuous panel of channels, 28, (FIG. 6) each channel 29 being made of a rectangular straight section, and the panel having a flat front surface, the material of the panel having good mechanical resistance and good thermal conductivity, and its surface being painted with a layer having very low thermal emissivity and very high solar radiation absorptivity, being it possible for said layer to be adhered by contact adhesive.

The tube bundle 25 may be subdivided into sub-bundles (FIGS. 7 and 17), to house between two consecutive sub-bundles, parallel to them, and thus vertically, rectangular pieces 30, made of the same material as the cover 2, and thus having high transparency, though alternatively pieces 30 made of a material similar to that of the internal layer of the wall of the box 100 may be used, with the same highly reflective coating, so that the cover 2 rests on the edge of said pieces 30, which, in turn, rest, also edgewise, on the rear wall 7, having in this case, for each sub-bundle, a specific set of thermo-hydraulic circuit, formed by the heat-conducting fluid inlet tubes 13, the tank 15 to which they arrive, the bended tubes 17 arranged into a parallel bundle, which come out from the aforementioned tank, and arrive from below to the vertical tubes, in a bundle as well, 25, which absorb the solar radiation, and are connected at their upper end to the bended tubes 18, which end into the tank 19, from which the outlet tubes 21 emerge (FIGS. 1 and 8).

All the external inlet tubing to the box 100 of the collector, or emerging from it, will be thermally insulated (FIGS. 1 and 8), and likewise, in the outlet conduits 21, there will exist a bended part, 31, to send said tubing in a vertical direction, and having in each bundle of tubing 21, after the bend 31, a temperature homogenization tank 32 and as a common pressure point.

There exists an alternative assembly to the tube bundle 25 and the associated elements of the heat-conducting fluid, in which the tubes 25 are not joined from below to the bended tubes 17, and from above to the 18, but rather in the alternative assembly the vertical tubes are joined to heads (FIGS. 9 to 11), which are the distributor 41 at the lower part, and the collector-funnel 33 at the upper part, this being connected to the outlet conduit 34, which crosses the rear wall 7, through a hole in which it is placed a spherical-type seal, 35, made of a material similar to that of the seals 16 and 20, and being the lower head or distributor joined to a heat-conducting fluid inflow conduit 42, which goes through the rear wall 7, through another hole in which it is placed a spherical-type seal, 43, made of a material similar to that of the seals 16 and 20.

In order to improve the redistribution of the thermal load between all the tubes of the radiation absorbent bundle, the tube bundle 25 joined to the heads may be covered at its front part by a metallic screen mutually joined to said tubes (FIG. 10), preferably by means of welding, the material of the screen having high conductivity, and it being painted or covered with an adhered substance having high radiation absorptivity and low emissivity.

The tubes 25 joined to the lower heads, 41, and upper heads, 33, may be mounted (FIG. 11) with a certain inclination angle, of about 10°, and a tank 39 which will be a common point of pressure, with redistribution of flows and balance of temperatures, may also be placed at half the height of the bundle.

The bundles of tubes 25, in the arrangement in which the lower heads, 41, and the upper heads, 33, are used, may be grouped in sub-bundles of parallel tubes (FIG. 17), each one with their corresponding heads, and their respective inlet conduits, 42, and outlet conduits, 34, the sub-bundles of tubes being separated by facing walls 30 made of the same material of the transparent cover, 2, though alternatively there may be used pieces 30 made of a material similar to that of the internal layer of the wall of the box 100, with the same highly reflective coating, rested edgewisely on that cover 2 and on the rear wall, 7.

In order to improve the mechanical behavior of the coating in the case of making a vacuum inside the box 100, the transparent cover that covers the opening of the box 100, for the radiation entrance, may be curved instead of flat (FIG. 14) as the piece 2, in this case the concave part of the curved coating 46 facing towards the interior of the box 100, and it being advisable to use the arrangements of sub-bundles of tubes 25 or sub-panels 28, so that the glass covers of each sub-bundle are like longitudinal glass blocks, along the vertical direction of the collector, being inset in the walls of the box 100, both the front and rear walls, finishing at their upper and lower ends by the insets of the upper and lower walls. This morphology of the transparent cover as blocks may be used in the case of using both tanks inset into the rear wall, such as 15 and 19, and conduits, 42 and 34, embedded in the spherical seals of said wall.

As an alternative to maintaining the box 100 under vacuum, or at a very low pressure, which will generate high mechanical stresses on the transparent cover thereof, the interior of the box 100 may be exclusively filled with an inert gas, such as nitrogen or carbon dioxide, whose pressure is maintained equal to the surrounding atmospheric pressure thanks to a device formed by a gas extraction tube 49, and the gas flow may be closed by a shut-off valve 50 which will be open at normal operation, having the tube itself a gas flow control valve, 51, with an operation mechanical or electromechanically controlled by differences in pressures between that of the interior of the box 100 and the atmospheric pressure, the valve being opened when the former becomes higher than the latter, in which case the gas is collected in a tank 52 which will be below said atmospheric pressure, which is achieved (FIG. 18) by the action of a compressor 53 which takes gas from said tank 52 and injects it into a tank 54 which is at a pressure above the atmospheric pressure; from which it is possible to inject gas again into the interior of the box 100 through a tube 55, in which there is a gas flow control valve, 56, which is opened when an internal pressure value of the box 100 below the atmospheric pressure is measured, with the operation of the valve 56 mechanically or electromechanically controlled, also having a shut-off valve 57 to completely shut-off the gas flow if necessary; and the volume of the low-pressure tank 52 being equal to the sum of the volumes of the interior of the boxes to which it is connected through standard tubes 49, in parallel between them, with standard valves 51 in each tube, reinforcing the casing of the tank 52 to withstand pressure differences equal to the atmospheric pressure; and having the high pressure tank 54 a similar volume, though its casing is reinforced to withstand internal pressures at least 5 times that of the atmospheric pressure.

The walls of the box 100, which correspond to a sandwich-type structure, with the thermal insulation as filling, and metallic plates on both faces, are prepared in four parts, numbered 83, 84, 85 and 86, (FIG. 22) the first being that of the upper quarter, which rests on the seal 20 of the tank 19, or alternatively, according to the circuit assembly used, it rests on the seal 35 of the tube 34, while on the front part it borders on the upper part of the seal frame 3; the sides of the walls of the box 100 being simply chamfered or cut in another way that favors its welding with the following quarter 84, which on its upper part borders on the recess made to inset the corresponding seal, either 20 in one type of assembly, or 35; while on the lower part the symmetrical operation is performed for the lower quarter, 86, the cover 2 being inset in the seal frame 3; and with the seal 16, or alternatively the spherical seal 43 (according to the assembly selected), on the upper edge of that piece 86, at its upper part, to subsequently inset the corresponding seal, either the 16 of the tank 15, or its alternative, which is the 43 of the conduit 42, closing the box 100 on the sides and the rear wall of the two intermediate quarters, which also have a small tab at the front part, to inset the corresponding part of the seal-frame 3; and closing the rear part, which remains hermetic when the two intermediate quarters 84 and 85 are joined, by means of the coupling of the two parts with an intermediate wedge, 87, the assembly being higher than necessary, so that the wedge forces the intermediate quarters of the wall, 84 and 85, to tighten the elements inset in said wall, the wedge being fixed by welding 88 along its whole length on the rear wall, as well as on the side walls of the box 100 along the edges 90, of the sides 89.

The wedge 87 has a similar constitution (FIG. 23) to that of the wall of the box 100, with a metallic external part, filled with insulation material, and covering the whole width of the rear wall, having some extensions 89 that are welded to the side walls of the box 100.

The edges of the box 100 (FIGS. 24 and 25), at the confluence of their different external walls, are reinforced with dihedral angles of metallic joint bars type 94, 95 or 96, at a right angle conjunction, 98, on each edge, being the ends of each joint bar chamfered at 45° so that it fits well at the conjunction trihedral angles of three walls such as 91, 92, and 93.

The spherical-type seals, 35 and 43 (FIGS. 15 to 18), which are inset in the rear wall of the box, in the corresponding holes for the passage of the heat-conducting fluid outlet and inlet conduits 34 and 42, respectively, are built from a sphere made of a solid insulation material with good properties under elastic compression with allowable deformations in the range of 0.1%, and a melting point much higher than the heat-conducting fluid operation temperature, and in said sphere a cylindrical drilled hole is made, whose axis coincides with a diameter of the sphere, the radius of the drilled hole being equal to the external radius of the corresponding conduit which will go through it.

The spherical-type seals, 35 and 43, which are inset into the rear wall of the box, in the corresponding holes for the passage of the conduits 34 and 42, may be built from two half spheres 47 and 48, (FIG. 16) made of the material indicated in the previous paragraph, to be mounted around the corresponding conduit, consolidating one another due to the pressure exercised by the assembly of the wall 7, thanks to the pressure exerted by the wedge 87, mounted as it has been explained.

Besides the transparent cover 2 a second transparent cover, 65, may be placed, parallel to 2, made of a similar or exactly the same material, with a narrow space in between, 64, having a thickness smaller than that of the covers (FIG. 20), connected to the external air by means of some holes 67 made at the lower part of the front wall 4, in which the second cover 65 is inset in a seal-frame 66, similar to the seal-frame 3, the mouths of the holes 67 being covered by some mosquito net-type filters 68 and 69, with a sieve having holes smaller than one millimeter.

In the interior of the box 100 there may be arranged some tongues or fins obliquely welded or fixed to its internal, front and rear, walls with the weld bead in a horizontal direction, as the tongues, so that they form an acute angle facing downwards with the front wall, both at the upper part of the box 100, forming the tongues 58, as well as below the opening of the transparent cover, forming the tongues 60; and the tongues 59 forming an acute angle facing upwards at its joining with the internal layer of the walls of the box, including a thermal insulation internal part, and having the same type of highly reflective coating, and providing the tongues with such a length that, at their expansion at the collector nominal operation temperature, their free end remains separated from the rear surface of the collecting conduits 11 or 28 by a distance that is between half a millimeter and one millimeter.

Each collector as a whole, 72, with its box 100 and the internal heat-conducting fluid circuit, may be placed in a multi-story structure 74, a metallic or reinforced concrete tower-type structure (FIG. 21), the collectors being connected with one another in series or in parallel, as appropriate to the application, the collectors hanging on the upper part of the box 100, from some pieces 80 of the structure 74, which may be welded or screwed to the lugs 81 (FIG. 22) integrally joined to the upper wall of the box 100, or to the dihedral angle joint bars that reinforce their edges, 94, being it possible for the collectors to remain with certain inclination downwards on the front face, so that the radiation reflected from a field of heliostats 70 placed on the ground is better received, and having the complete heat-conducting fluid circuit from the place where the beneficial good of the installation is exploited, from which it arrives at the structure of collectors through the tubing 76, returning to the beneficial good at a much higher temperature through the tubing 78, overcoming the loss of manometric head due to fluid friction and the ascension through the structural tower by means of a pump 77, and the circuit having the tanks 79 that are useful for mixing the fluid parallel flows, between successive staggering of collectors.

Once the invention has been clearly described, it is highlighted that the particular embodiments hereinabove described are susceptible of small modifications providing that they do not alter the fundamental principle and essence of the invention.

The invention claimed is:

1. Thermal solar energy collector comprising:
   a plurality of collecting conduits, solar energy absorbent of solar radiation striking on said collecting conduits, inside of which a heat-conducting fluid circulates that collects the solar energy absorbed by the collecting conduits circulates, said collecting conduits being arranged in a vertical position, and the set of collecting conduits comprising one heat-conducting fluid inlet end and one outlet end,
   means for delivering heat-conducting fluid to the collecting conduits, connected to the inlet ends of said collecting conduits, wherein the means for delivering the heat-conducting fluid to the collecting conduits comprise:
      a plurality of first connection tubes comprising a 90° bend, and connected at one of their ends to the inlet ends of the collecting conduits, and at the other end to at least one cylindrical horizontal inlet tank, having semispherical finishing pieces at two longitudinal ends of the inlet tank, inset in the rear wall in an airtight housing covered by an elastic and thermal insulation first seal that covers a whole volume of the inlet tank, and that accommodate deformations of the inlet tank of 0.1%, said inlet tank being connected in an area which is diametrically opposed to that of the first connection tubes to a plurality of heat-conducting fluid inlet tubes to the collector; and
   means for collecting the heat-conducting fluid from the collecting conduits, connected to the outlet ends of said collecting conduits, the means for collecting the heat-conducting fluid from the collecting conduits comprises:
      a plurality of second connection tubes comprising a 90° bend, and connected at one of their ends to the outlet ends of the collecting conduits, and at the other end to at least one cylindrical horizontal outlet tank, having semispherical finishing pieces at two longitudinal ends of the outlet tank, inset in the rear wall in an airtight housing covered by an elastic and thermal insulation second seal which covers a whole volume of the outlet tank, and which absorbs deformations of the outlet tank of 0.1%, said outlet tank being connected in an area which is diametrically opposed to that of the second connection tubes to a plurality of heat-conducting fluid outlet tubes to the collector; the collecting conduits, at least part of the means for delivering the heat-conducting fluid to the collecting conduits and at least part of the means for collecting the heat-conducting fluid from the collecting conduits are located in the interior of an airtight box, the airtight box having a structure comprising:
      a resistant metallic internal plate covered, on the face that faces the interior of the box, with a high index reflectivity layer painted or adhered to the internal plate;
      a resistant metallic external plate between the internal and the external layers;
      an intermediate volume filled with the thermal insulation material, the airtight box comprising:
      side walls,
      an upper wall,
      a lower wall,
         a rear wall in which at least part of the means for delivering the heat-conducting fluid and at least part of the means for collecting the heat-conducting fluid are inset in airtight housings covered by seals made of elastic and thermal insulation materials which absorb the deformations of said means for delivering and means for collecting the heat-conducting fluid in the range of 0.1%, and
         a front wall with surface opening for the passage of the solar radiation to the collecting conduits, and said surface opening closed by a transparent cover inset in the front wall by a pressure seal.

2. Thermal solar energy collector, according to claim 1, wherein:
   the collecting conduits are a plurality of vertical channels having a rectangular straight section and forming a continuous panel of channels with a flat front surface,
   and the means for delivering the heat-conducting fluid are connected to the inlet ends of the channels, and the means for collecting the heat-conducting fluid are connected to the outlet ends of the channels.

3. Thermal solar energy collector, according to claim 2, comprising a temperature homogenization tank located between the collecting conduits, at half the height thereof, which divides said collecting conduits into two longitudinal sections by height.

4. Thermal solar energy collector, according to claim 2, comprising:
   a metallic screen for radiation absorption, having high conductivity, fixed to the front part of a bundle of collecting tubes,
   and said metallic screen for radiation absorption is covered with a layer having a high absorptivity and a low emissivity to radiation, selected between paint and an adhesive.

5. Thermal solar energy collector, according to claim 2 wherein:
   the means for delivering the heat-conducting fluid to a bundle of collecting tubes comprise:
   a distribution head, to which the heat-conducting fluid arrives through an inflow conduit which goes through the rear wall of the airtight box through a hole made on said rear wall in which a fourth spherical seal is provided:
   the means for collecting the heat-conducting fluid from the bundle of the collecting tubes comprise a collecting funnel connected at a larger end to the outlet end of the collecting tubes and at a smaller end to an outlet conduit going through the rear wall of the airtight box through a hole drilled on said rear wall in which a third spherical seal is provided.

6. Thermal solar energy collector, according to claim 5, wherein the collecting tubes are oblique relative to the vertical at a 10° angle.

7. Thermal solar energy collector, according to claim 5, wherein the bundle of collecting tubes is divided into a plurality of sub-bundles,
- the collector comprising a supporting piece arranged between two consecutive sub-bundles parallel to said sub-bundles, said supporting pieces resting on their rear edge on the rear wall of the airtight box, and the transparent cover resting on the front edge of the supporting pieces,
- the means for delivering the heat-conducting fluid to the collecting tubes comprise for each one of the sub-bundles:
- a distribution head, to which the heat-conducting fluid arrives through an inflow conduit going through the rear wall of the airtight box through a hole made on said rear wall in which the fourth spherical seal is provided,
- and the means for collecting the heat-conducting fluid from the collecting tubes comprise for each one of the sub-bundles a collecting funnel-connected on a larger end to the outlet end of the collecting tubes and on a smaller end to an outlet conduit going through the rear wall of the airtight box through a hole drilled in said rear wall in which a third spherical seal is provided.

8. Thermal solar energy collector, according to claim 5, wherein:
- a third spherical seal and the fourth spherical seal arranged in the rear wall of the airtight box are made from a sphere made of elastic and thermal insulation materials which accommodate deformations of 0.1% in the outlet conduit and in the inflow conduit,
- a cylindrical drilled hole being made in said sphere, the drilled hole having an
- axis coinciding with a diameter of the sphere, and the drilled hole having a radius equal to an external radius of the conduit.

9. Thermal solar energy collector, according to claim 5, wherein:
- a third spherical seal and the fourth spherical seal arranged in the rear wall of the airtight box are made from a first semispherical part and a second semispherical part complementary to the first semispherical part made of elastic and thermal insulation materials which accommodate deformations of 0.1% in the outlet conduit and in the inflow conduit,
- which are mounted around the conduits and fixed by the pressure exercised by the rear wall of the airtight box.

10. Thermal solar energy collector, according to claim 1, wherein:
- the collecting conduits are a plurality of collecting tubes which form a vertical bundle;
- and the means for delivering the heat-conducting fluid are connected to the inlet ends of the collecting tubes, and the means for collecting the heat-conducting fluid are connected to the outlet ends of the collecting tubes.

11. Thermal solar energy collector, according to claim 1, wherein:
- the airtight box comprises at the lower wall a suction channel for the connection of a suction compressor for making the vacuum in the interior of said airtight box,
- and in said suction channel there is a shut-off valve.

12. Thermal solar energy collector, according to claim 1, wherein the external surface of the walls of the airtight box is covered with a coating having high reflectivity to radiation, selected between paint and an adhesive.

13. Thermal solar energy collector, according to claim 1, wherein the internal surface of the walls of the airtight box is covered with a coating having high reflectivity to radiation, selected between paint and an adhesive.

14. Thermal solar energy collector, according to claim 1, wherein:
- a bundle of collecting tubes is divided into a plurality of sub-bundles,
- and comprising a supporting piece arranged between two consecutive sub-bundles parallel to said sub-bundles, said supporting pieces resting by a rear edge on the rear wall of the airtight box, and the transparent cover resting on the front edge of the supporting pieces,
- and the means for delivering the heat-conducting fluid to the collecting tubes comprise an inlet tank for each one of the sub-bundles, and the means for collecting the heat-conducting fluid from the collecting tubes comprise an outlet tank for each one of the sub-bundles.

15. Thermal solar energy collector, according to claim 14, wherein the supporting pieces are transparent and made of the same material as the transparent cover.

16. Thermal solar energy collector, according to claim 14, wherein the supporting pieces are made of the same material as the internal plate of the structure of the airtight box, and with the same high index reflectivity coating.

17. Thermal solar energy collector, according to claim 14, wherein
- the transparent cover that closes the surface opening of the front wall comprises a plurality of transparent blocks, each block arranged covering each of the sub-bundles of the collecting tubes, so that the glass covers of each sub-bundle are the longitudinal glass blocks, along the vertical direction of the collector, being inset in both the front and rear walls of the box, finishing at their upper and lower ends by the inset in the upper and lower walls; enabling using the transparent cover in blocks in the case of using fluid tanks inset in the rear wall, as well as conduits, embedded into the spherical seals in said wall.

18. Thermal solar energy collector, according to claim 1, comprising:
- a plurality of first fins obliquely welded in the interior of the front wall of the airtight box, placed above the transparent cover, forming an acute angle with said front wall and directed towards the lower wall of said airtight box,
- a plurality of second fins obliquely welded in the interior of the front wall of the airtight box, placed below the transparent cover, forming an acute angle with said front wall and directed towards the lower wall of said airtight box,
- and a plurality of third fins obliquely welded along the interior of the rear wall of the airtight box, forming an acute angle with said rear wall and directed towards the upper wall of said airtight box,
- the fins being made of an insulation material and covered with a high radiation reflectivity coating, selected between paint and an adhesive,
- and having said third fins such a length that at their expansion at the collector nominal operation temperature, a free end remains separated from the rear surface of the collecting conduits by a distance that is between half a millimeter and one millimeter.

19. Thermal solar energy collector, comprising:
- a plurality of collecting conduits, solar energy absorbent of solar radiation striking on said collecting conduits, inside of which a heat-conducting fluid circulates that collects the solar energy absorbed by the collecting conduits circulates, said collecting conduits being arranged in a vertical position, and the set of collecting conduits comprising one heat-conducting fluid inlet end and one outlet end, means for delivering heat-conducting fluid to the collecting conduits, connected to the inlet ends of said collecting conduits, and means for collecting the heat-conducting fluid from the collecting conduits, connected to the outlet ends of said collecting conduits, the collecting conduits, at least part of the means for delivering the heat-conducting fluid to the collecting conduits and at least part of the means for collecting the heat-conducting fluid from the collecting conduits are located in the interior of an airtight box, the airtight box comprising:

a resistant metallic internal plate covered, on the face that faces the interior of the box, with a high index reflectivity layer painted or adhered to the internal plate;

a resistant metallic external plate between the internal and the external layers;

an intermediate volume filled with the thermal insulation material, the airtight box comprising:

side walls, an upper wall, a lower wall, a rear wall in which at least part of the means for delivering the heat-conducting fluid and at least part of the means for collecting the heat-conducting fluid are inset in airtight housings covered by seals made of elastic and thermal insulation materials which absorb the deformations of said means for delivering and means for collecting the heat-conducting fluid in the range of 0.1%, and a front wall with surface opening for the passage of the solar radiation to the collecting conduits, and said surface opening closed by a transparent cover inset in the front wall by a pressure seal;

wherein:

the interior of the airtight box is filled with an inert gas selected from nitrogen and carbon dioxide, and the internal pressure of the airtight box is maintained substantially equal to the atmospheric pressure by means of a pressure control circuit comprising:

a gas extraction tube that has a first shut-off valve and a first gas flow control valve mechanically or electromechanically activated by the pressure differences existing between the interior of the airtight box and the atmospheric pressure, a first gas reservoir that stores inert gas extracted from the airtight box when necessary for pressure control, and that is at a lower pressure than the atmospheric pressure, the gas reservoir being connected to a compressor which takes the gas from the first gas reservoir and injects the gas into a second gas reservoir which is a higher pressure than the atmospheric pressure, and injects inert gas into the airtight box when necessary for pressure control, through a gas outlet tube in the airtight box, having a second gas flow control valve mechanically or electromechanically activated by the pressure differences existing between the interior of the airtight box and the atmospheric pressure, and a second shut-off valve, the first gas reservoir being reinforced to withstand pressure differences equal to the atmospheric pressure, and the second gas reservoir being reinforced to withstand pressures at least five times the atmospheric pressure.

20. Thermal solar energy collector, comprising:

a plurality of collecting conduits, solar energy absorbent of solar radiation striking on said collecting conduits, inside of which a heat-conducting fluid circulates that collects the solar energy absorbed by the collecting conduits circulates, said collecting conduits being arranged in a vertical position, and the set of collecting conduits comprising one heat-conducting fluid inlet end and one outlet end, means for delivering heat-conducting fluid to the collecting conduits, connected to the inlet ends of said collecting conduits, and means for collecting the heat-conducting fluid from the collecting conduits, connected to the outlet ends of said collecting conduits, the collecting conduits, at least part of the means for delivering the heat-conducting fluid to the collecting conduits and at least part of the means for collecting the heat-conducting fluid from the collecting conduits are located in the interior of an airtight box, the airtight box comprising:

a resistant metallic internal plate covered, on the face that faces the interior of the box, with a high index reflectivity layer painted or adhered to the internal plate;

a resistant metallic external plate between the internal and the external layers;

an intermediate volume filled with the thermal insulation material, the airtight box comprising:

side walls, an upper wall, a lower wall, a rear wall in which at least part of the means for delivering the heat-conducting fluid and at least part of the means for collecting the heat-conducting fluid are inset in airtight housings covered by seals made of elastic and thermal insulation materials which absorb the deformations of said means for delivering and means for collecting the heat-conducting fluid in the range of 0.1%, and a front wall with surface opening for the passage of the solar radiation to the collecting conduits, and said surface opening closed by a transparent cover inset in the front wall by a pressure seal;

an additional transparent cover fixed in parallel to the transparent cover, inset in the front wall of the airtight box by an additional pressure seal existing between the transparent cover and the additional transparent cover, an intermediate space having a smaller thickness than the transparent covers connected to the exterior by a plurality of holes drilled at the lower part of the front wall of the airtight box, which comprise a first filter at one of the ends of each one of the holes and a second filter at the other end, both filters having a sieve with holes smaller than one millimeter.

* * * * *